United States Patent
Yano et al.

[11] Patent Number: 5,936,631
[45] Date of Patent: Aug. 10, 1999

[54] MOBILE NAVIGATION SYSTEM

[75] Inventors: Fumiko Yano; Hirofumi Goto, both of Hyogo, Japan

[73] Assignee: Mitsubishi Denki Kabushiki Kaisha, Tokyo, Japan

[21] Appl. No.: 08/950,415

[22] Filed: Oct. 24, 1997

Related U.S. Application Data

[63] Continuation of application No. 08/496,167, Jun. 28, 1995, abandoned.

[30] Foreign Application Priority Data

Jan. 20, 1995 [JP] Japan .................................. 7-007339

[51] Int. Cl.⁶ .................................................. G06T 11/20
[52] U.S. Cl. ........................... 345/428; 345/439; 340/995; 701/209; 701/212
[58] Field of Search ........................... 395/128, 139; 364/443, 449.2, 449.3, 449.4, 449.5, 449.6, 449.7; 340/990, 995; 345/428, 439; 701/200, 208, 209, 210, 211, 212, 213

[56] References Cited

U.S. PATENT DOCUMENTS

| | | | |
|---|---|---|---|
| 4,675,676 | 6/1987 | Takanabe et al. | 340/995 |
| 4,689,747 | 8/1987 | Kurose et al. | 364/443 |
| 4,760,531 | 7/1988 | Yasui et al. | 364/443 |
| 5,031,104 | 7/1991 | Ikeda et al. | 364/449.3 |

FOREIGN PATENT DOCUMENTS

| | | |
|---|---|---|
| 4178682 | 6/1992 | Japan . |
| 580699 | 4/1993 | Japan . |

*Primary Examiner*—Mark K. Zimmerman
*Attorney, Agent, or Firm*—Sughrue, Mion, Zinn, Macpeak & Seas, PLLC

[57] ABSTRACT

In a mobile navigation system of the present invention, a route between two desired points can be easily recognized on any scale. The mobile navigation system includes a CD-ROM for storing map data therein, an operation panel on which a user performs operations, a vehicle position detecting unit for detecting a vehicle position, a CRT display for displaying a map image thereon together with route marks and a vehicle position mark, and a navigation controller for searching the most suitable guidance route from a departure spot to a destination. When a detailed map and a wide-area map are used, routes are respectively displayed by different methods by displaying large route marks in the detailed map and displaying small route marks in the wide-area map.

13 Claims, 24 Drawing Sheets

| ADDRESS | | |
|---|---|---|
| F000 | NODE | N000 (DEPARTURE SPOT) |
| F001 | NODE | N001 |
| F002 | NODE | N002 |
| ⋮ | | ⋮ |
| FFFE | NODE | NFFE |
| FFFF | NODE | NFFF (DESTINATION) |

ROUTE MARK

VEHICLE POSITION MARK

MOBILE NAVIGATION SYSTEM

This is a Continuation of application Ser. No. 08/496,167 filed Jun. 28, 1995, now abandoned.

BACKGROUND OF THE INVENTION

1. Field of the Invention

The present invention relates to a mobile navigation system for displaying maps and displaying various routes on the displayed maps.

2. Description of the Related Art

FIG. 31 is a block diagram showing a conventional mobile navigation system disclosed in Japanese Patent Application Laid-Open No. 60-108709, for example. In the same drawing, reference numerals 21, 22, 23, 24, 25 and 26 respectively indicate a distance sensor, a bearing sensor, a signal processing device such as a CPU or the like, a running route storage device composed of one of various memories, a display and an operation device such as a keyboard or the like.

The operation of the mobile navigation system will now be described. Using the operation device 26, a user provides the present position of a vehicle on a map to the signal processing device 23 at the time of departure and sets a vehicle traveling direction on the map to a proper position. Each time the vehicle is driven by a predetermined distance (which is regarded as a distance X below) after the vehicle departs, position data is stored in its corresponding memory table provided within the running route storage device 24.

Four map display scales of 1 to 50000, 1 to 100000, 1 to 200000 and 1 to 400000 are available as display scales of maps displayed on the display 25. Memory tables corresponding to the display scales are provided within the running route storage device 24. The signal processing device 23 calculates position data, based on data outputted from the distance sensor 21 and the bearing sensor 22 whenever necessary. The calculated position data are respectively stored in the memory tables for the display scales of 1 to 50000, 1 to 100000, 1 to 200000 and 1 to 400000 each time the vehicle travels by distances 2x, 4x, 8x and 16x.

FIG. 32 is a view for describing structures of memory tables. Reference numeral 31 indicates a memory table for storing position data corresponding to a display scale of 1 to 50000. Reference numerals 32, 33 and 34 respectively indicate memory tables for storing position data corresponding to display scales of 1 to 100000, 1 to 200000 and 1 to 400000 therein.

The signal processing device 23 reads position data corresponding to scales of maps displayed on the display 25 from the memory tables 31 through 34 and supplies the read position data to the display 25. When the map is displayed on the scale of 1 to 200000, for example, the display 25 displays, as vehicle travel loci, data set on every distance 8x, which have been read from the memory table 33. When the map is displayed on the scale of 1 to 100000, the display 25 displays, as vehicle travel loci, data set on every distance 4x, which have been read from the memory table 32. Further, when the map is displayed on the scale of 1 to 50000, the display 25 displays, as vehicle travel loci, data set on every distance 2x, which have been read from the memory table 31. Thus, even when the map is displayed on any display scale, the vehicle travel loci are displayed on the display screen at equal intervals.

The conventional mobile navigation system is constructed as described above. Further, the distances traveled by the vehicle are calculated and the vehicle travel loci are displayed for each of the distances corresponding to the respective map scales. However, this method can be applied to the case where the loci are displayed after the vehicle has been driven. However, when a route such as a route to be recommended along which the vehicle is not yet driven, is displayed, such a conventional method cannot be used.

SUMMARY OF THE INVENTION

With the foregoing problems in view, it is therefore an object of the present invention to provide a mobile navigation system capable of easily displaying route marks on a route along which a vehicle is not yet driven, at intervals corresponding to respective map scales.

In order to achieve the above object, a mobile navigation system according to one aspect of the present invention comprises map data storing means for storing therein respective map data about maps so as to correspond to a plurality of scales, route storing means for storing therein data about a route between desired two points, and map displaying means for displaying a map and a route thereon based on the map data and the route data. The map displaying means switches a display of the route from one to another according to the scale of each map.

A mobile navigation system according to another aspect of the present invention comprises map data storing means for storing map data therein in association with a first scale and a second scale larger than the first scale, route storing means for storing therein data about a route between desired two points and map displaying means for displaying a first map based on the map data corresponding to the first scale, displaying a second map based on the map data corresponding to the second scale and displaying route marks on the first or second map based on the route data. The map displaying means sets the route marks displayed on the first map so as to become smaller in size than the route marks displayed on the second map.

A mobile navigation system according to a further aspect of the present invention comprises map data storing means for storing map data therein in association with a first scale and a second scale different from the first scale, route storing means for storing data about a route between desired two points therein and map displaying means for displaying a first map based on the map data corresponding to the first scale, displaying a second map based on the map data corresponding to the second scale and displaying route marks on the first or second map based on the route data. The map displaying means makes the route marks displayed on the first map different in shape from the route marks displayed on the second map.

A mobile navigation system according to a still further aspect of the present invention comprises map data storing means for storing map data comprised of links and nodes therein, route storing means for storing route data between two desired points therein and map displaying means for displaying a map based on the map data and displaying a route mark at a predetermined point on each link based on the route data.

A mobile navigation system according to a still further aspect of the present invention comprises map data storing means for storing map data comprised of links and nodes therein, route storing means for storing route data between two desired points therein and map displaying means for displaying a map based on the map data and displaying, based on the route data, route marks on their corresponding links of the links, each of which has a predetermined range of length on the map.

A mobile navigation system according to a still further aspect of the present invention comprises map data storing means for storing map data comprised of links and nodes therein in association with a first scale and a second scale different from the first scale, route storing means for storing route data between two desired points therein and map displaying means for displaying a first map based on the map data corresponding to the first scale, displaying a second map based on the map data corresponding to the second scale and displaying route marks on their corresponding predetermined links extending on the first or second map based on the route data. At least one link on which no route mark is displayed, exists between the predetermined links on the second map.

A mobile navigation system according to a still further aspect of the present invention is provided with route calculating means for calculating route data.

DETAILED DESCRIPTION OF THE PREFERRED EMBODIMENTS

Preferred embodiments of the present invention will hereinafter be described in detail with reference to the accompanying drawings.

[First Embodiment]

Figure 1:
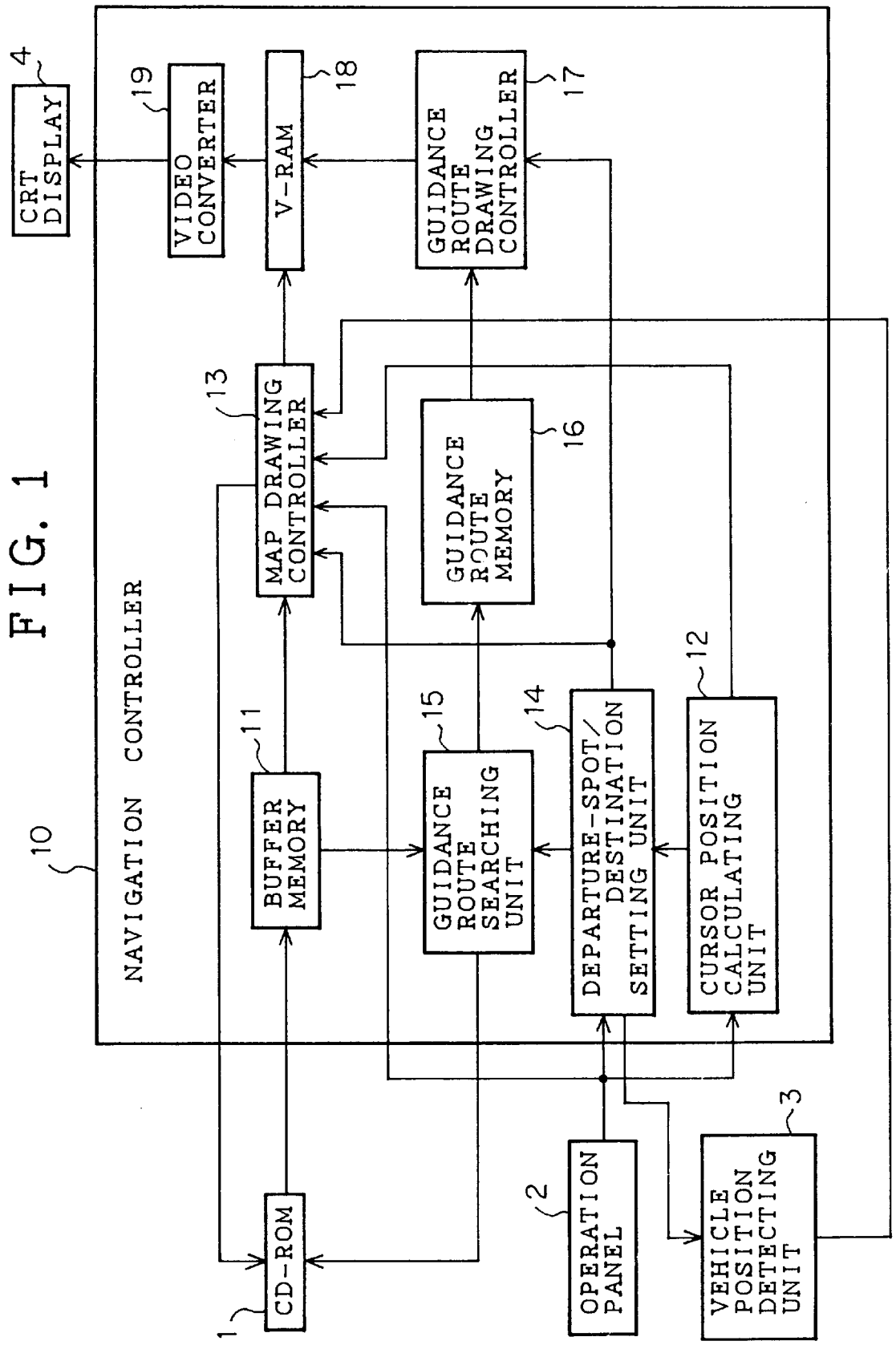
FIG. 1 is a block diagram showing a first embodiment of the present invention.
Figures 2, 3:
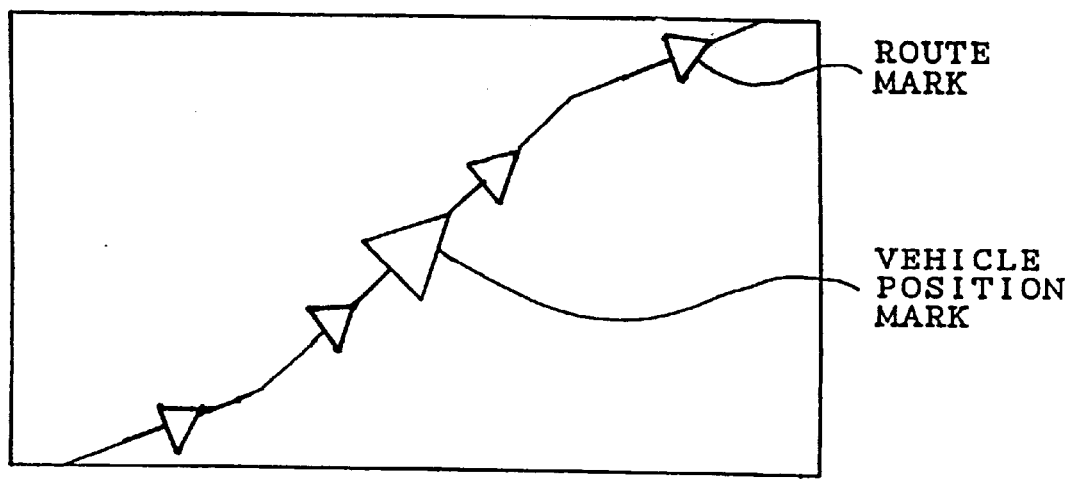
FIG. 2 is a view for describing addresses at which nodes employed in the first embodiment of the present invention are respectively stored.
FIG. 3 is a view for explaining a screen on which a detailed map employed in the first embodiment is displayed.
Figure 4:
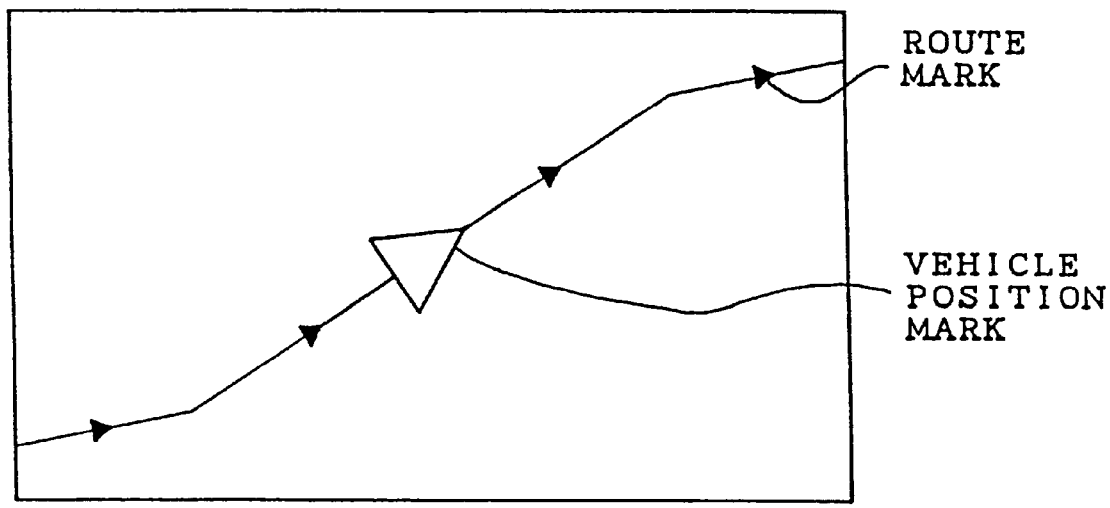
FIG. 4 is a view for describing a screen on which a wide-area map employed in the first embodiment is displayed.
Figure 5:
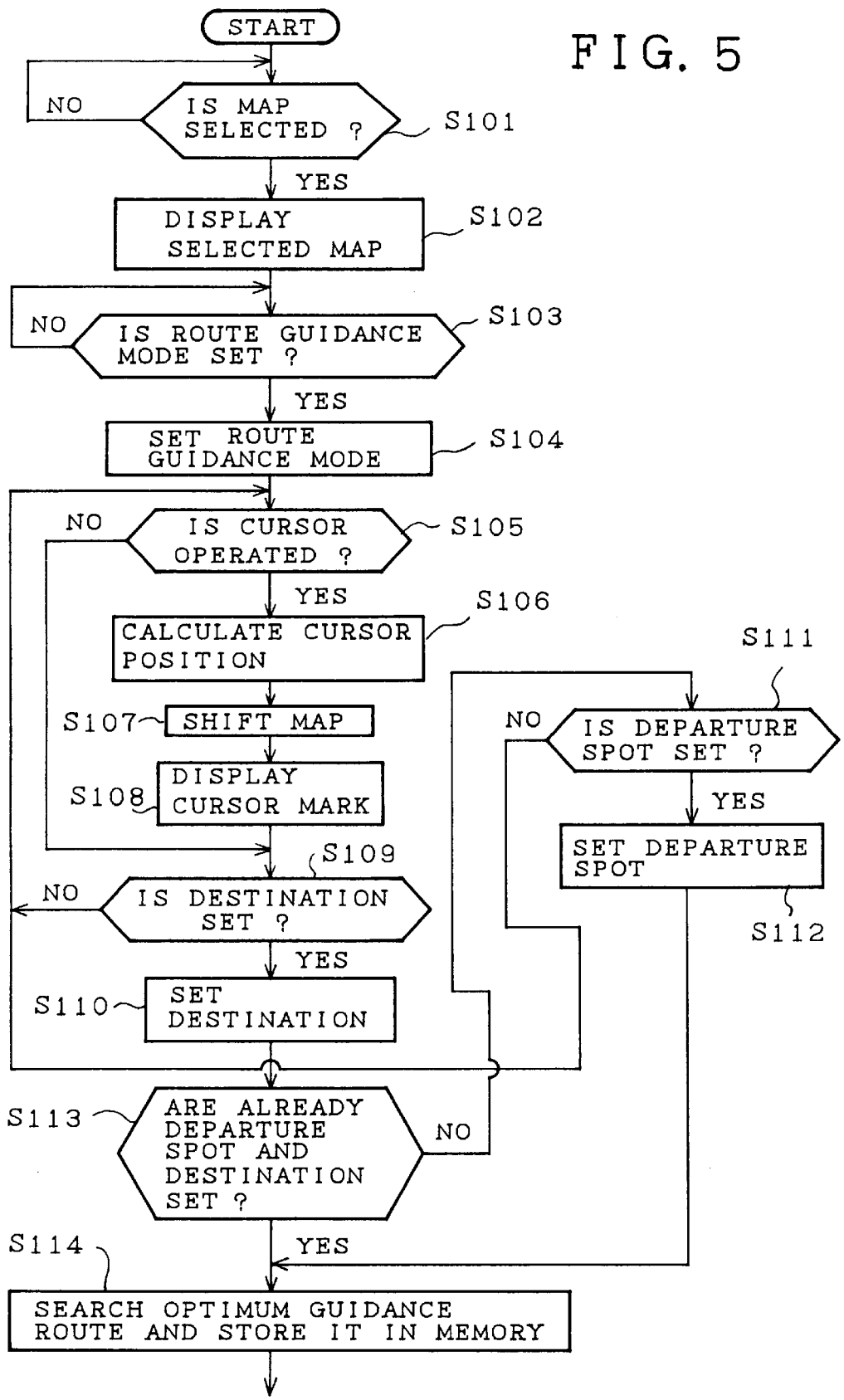
FIG. 5 is a flowchart for describing a guidance route searching operation executed in the first embodiment.
Figure 6:
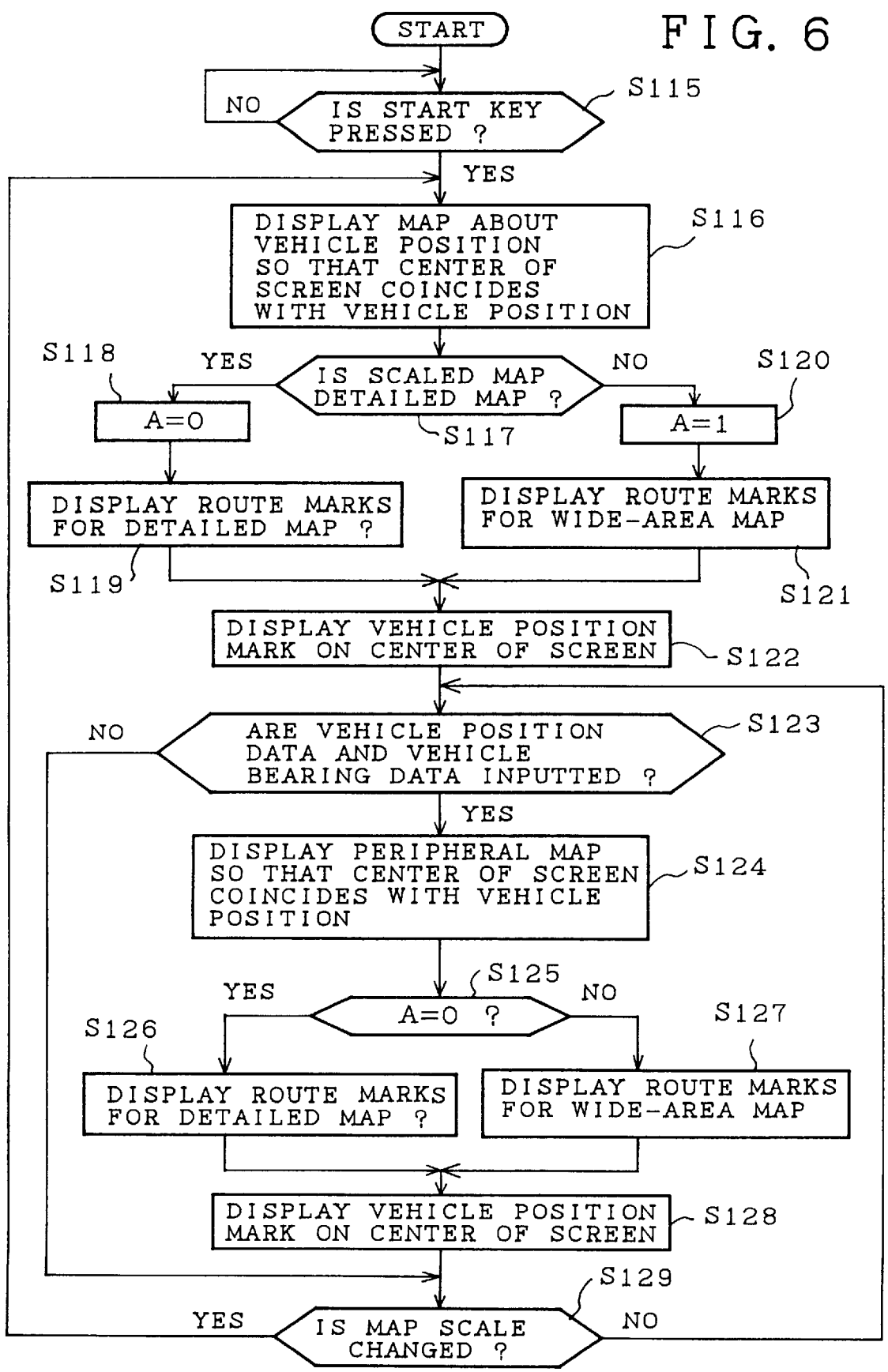
FIG. 6 is a flowchart for describing a map display operation executed in the first embodiment.

FIG. 1 is a block diagram showing a mobile navigation system according to a first embodiment of the present invention. FIG. 2 is a view for describing addresses at which nodes are respectively stored. FIG. 3 is a view for explaining a screen on which a detailed map is displayed. FIG. 4 is a view for describing a screen with a wide-area map displayed thereon. FIG. 5 is a flowchart for describing a guidance route searching operation. FIG. 6 is a flowchart for describing an operation for displaying a map including route marks.

In FIG. 1, reference numeral 1 indicates a CD-ROM used as a map data storing means in which map data are stored. Reference numeral 2 indicates an operation panel which includes cursor keys respectively capable of shifting a cursor mark in left, right, upward and downward directions, a route guidance mode set key, a departure spot set key, a destination set key, a map retrieval changeover key, a map scale changeover key, a start key, etc. Thus, a user can arbitrarily move or shift the cursor mark on a displayed map by operating the cursor keys. Reference numeral 3 indicates a vehicle position detecting unit having a direction sensor and a distance sensor, for detecting a position of a driven vehicle by these sensors and outputting vehicle position data and vehicle bearing data therefrom. Reference numeral 4 indicates a CRT display used as a map displaying means, which is capable of displaying a map on its screen based on an input video signal and also displaying a present position mark, guidance route marks, etc. thereon. Further, colors for displaying roads can be changed on the CRT display 4 according to the attributes of roads such as an expressway, a national road, a local road, etc.

Reference numeral 10 indicates a navigation controller which decides or determines the optimum guidance route between the departure spot and the destination by route searching. Further, the navigation controller 10 generates map image data about the periphery of the present position of the vehicle and outputs the generated data to the CRT display 4 together with the present vehicle position mark, the guidance route marks, etc.

Designated at numeral 11 in the navigation controller 10 is a buffer memory for temporarily storing map data read from the CD-ROM 1 therein. Reference numeral 12 indicates a cursor position calculating unit, which calculates the longitude and latitude corresponding to the position (normally the center of a displayed map) of a cursor on the screen when a map selection operation or a cursor operation is performed through the cursor keys, the map retrieval changeover key, the map scale changeover key or the like on the operation panel 2 and outputs the result of calculation as cursor position data therefrom.

Reference numeral 13 indicates a map drawing controller which reads map data corresponding to a scale selected by the map retrieval changeover key, the map scale changeover key or the like included in the operation panel 2 into the buffer memory 11 from the CD-ROM 1 before the vehicle starts to run or is driven, and draws a map image on a V-RAM 18. When the vehicle is running, the map drawing controller 13 reads new map data into the buffer memory 11 from the CD-ROM 1 as needed as vehicle position data and vehicle bearing data inputted from the vehicle position detecting unit 3 vary. Thereafter, the map drawing controller 13 brings the map image in the V-RAM 18 up to date so that the present vehicle position is normally placed in the center of the screen, displays an arrow-like vehicle position mark at the center of the map image in the V-RAM 18 and places the arrow of the vehicle position mark in a vehicle traveling or heading direction determined from the vehicle bearing data.

Reference numeral 14 indicates a departure-spot/destination storage or setting unit. When a departure spot and a destination are set under the operation of the operation panel 2 before the vehicle starts to run, the departure-spot/destination storage unit 14 stores the longitudes and latitudes of both the departure spot and the destination therein as departure-spot position data and destination position data. Reference numeral 15 indicates a guidance route searching unit used as a route calculating means. When a departure spot and a destination are set by the operation panel 2, the guidance route searching unit 15 reads departure-spot position data about the departure spot and destination position data about the destination from the departure-spot/destination storage unit 14. Further, the guidance route searching unit 15 reads route-searching map data required to search a route from the departure spot to the destination into the buffer memory 11 from the CD-ROM 1. Furthermore, the guidance route searching unit 15 searches a guidance route most-suited to reach from the departure spot to the destination by referring to the read map data, e.g., based on a route indicative of the shortest distance on a map and taking into consideration highway conditions, traffic hold-up information, etc. A series of nodes (each including coordinates of a longitude and a latitude) constituting the searched guidance route is stored in a guidance route memory 16 as guidance route data together with departure-spot data and destination data.

Reference numeral 16 indicates the guidance route memory used as a route storing means for storing guidance route data therein. As shown in FIG. 2, the third power of 16 ($16^3$) addresses ranging from F000 through FFFF are prepared as addresses set within the guidance route memory 16. A sequence of nodes determined in the guidance route searching unit 15 is stored at addresses in the following order. Departure-spot data is stored at the address F000. The series of nodes is stored in turn at the addresses F001 through FFFE as in the case where a node subsequent to a departure spot on a guidance route is stored at the address F001, a node subsequent to that node is stored at the address F002, . . . Destination data is stored at the rearmost address (e.g., address FFFF if $16^3$ addresses are prepared as a sequence of nodes).

Assuming now that a series of nodes is set as N000 through NFFF, N000 is represented as departure-spot data, NFFF is represented as destination data and N001 through NFFE are represented as position data at midway between the departure-spot data and the destination data.

Reference numeral 17 indicates a guidance route drawing controller. When the vehicle is running, the guidance route drawing controller 17 receives guidance route data existing within a range of a map image being drawn or plotted in the V-RAM 18 at present from the guidance route data stored in the guidance route memory 16 and draws a guidance route in accordance with a drawing method corresponding to the scale of the map image in the V-RAM 18.

Reference numeral 18 indicates the V-RAM which stores therein a map image drawn by the map drawing controller 13 and a guidance route drawn by being superposed on the map image by the guidance route drawing controller 17 and outputs them therefrom as image data. Reference numeral 19 indicates a video converter for converting image data outputted from the V-RAM 18 to a video signal and outputting the converted signal to the CRT display 4.

The CRT display 4 can display maps drawn on seven scales of 1 to 12500, 1 to 25000, 1 to 50000, 1 to 100000, 1 to 400000, 1 to 1600000 and 1 to 6400000 in total, for example. When the maps drawn on the scales are displayed, reduced scales displayed on the CRT display 4 together with the maps are 100 m, 250 m, 500 m, 1 km, 4 km, 15 km and 60 km in order. Any of the reduced scales is represented as a scale having a width of about 1 cm.

Now, each of the maps drawn on the scales of 1 to 12500 through 1 to 100000 will be called a "detailed map", whereas each of the maps drawn on the scales of 1 to 400000 through 1 to 6400000 will be called a "wide-area map".

The operation of the first embodiment will now be described briefly. First, a user operates the operation panel 2 to set a departure spot and a destination. Next, the guidance route searching unit 15 performs route searching to search or find a route to be recommended between the departure spot and the destination. Thereafter, route marks are displayed on a displayed map. When the displayed map is found to be the detailed map, large route marks are displayed as shown in FIG. 3. On the other hand, when the displayed map is founded to be the wide-area map, small route marks are displayed as illustrated in FIG. 4. This display method can be realized by allowing the guidance route drawing controller 17 to store two kinds of data: data about the large route marks for the detailed map and data about the small route marks for the wide-area map and using these properly according to the scale of the map.

FIGS. 5 and 6 are respectively flowcharts for describing the operation of the navigation controller 10. The operation of the present embodiment will be described below in accordance with FIGS. 5 and 6.

A description will first be made of guidance route searching with reference to FIG. 5. When a user operates the map retrieval changeover key on the operation panel 2 a map of a desired area on a desired scale is displayed, the map drawing controller 13 reads desired map data into the buffer memory 11 from the CD-ROM 1 and instructs the V-RAM 18 to draw a map image. Thereafter, the video converter 19 converts data about the map image drawn in the V-RAM 18 to a video signal and outputs the result of conversion to the CRT display 4. The CRT display 4 displays a map on the screen thereof based on the video signal inputted thereto (S101, S102).

Next, when the operation panel 2 is operated to set a route guidance mode, a cursor mark is centrally displayed on the displayed map. When the cursor key of the operation panel 2 is operated to change or shift the cursor mark, the cursor position coordinate calculating unit 12 calculates data (coordinates of longitude and latitude) about the shifted position of the cursor mark (S103 through S106). In response to the change in the position of the cursor, which has been calculated by the cursor position coordinate calculating unit 12, the map drawing controller 13 draws a map image in the V-RAM 18 in such a way as to place the cursor mark in the center of the display screen at all times while reading map data existing within a predetermined range into the buffer memory 11 from the CD-ROM 1. Further, the map drawing controller 13 draws the cursor mark on the center of the map image in the V-RAM 18. As a result, the map on the screen is scrolled in accordance with the cursor operation in a state in which the cursor mark has been centrally displayed on the display screen (S107, S108). Namely, the cursor mark does not move on the display screen and the map is moved or shifted according to the amount of operation by the cursor key.

The user operates the cursor key so that the cursor mark on the display screen reaches an intended spot or a destination. When the cursor mark reaches the destination, the user temporarily stops a cursor operation. Next, the user presses down the destination set key on the operation panel 2. When the destination set key is depressed, the departure-spot/destination setting unit 14 registers the cursor position data outputted from the cursor position calculating unit 12 therein as destination data (S109, S110). The user operates the cursor again to shift or move the map on the screen. When the cursor mark reaches the departure spot, the user temporarily stops his/her cursor operation. When the user presses the departure spot set key on the operation panel 2, the departure-spot/destination setting unit 14 registers the cursor position data outputted from the cursor position calculating unit 12 therein as departure-spot data (S111, S112).

Thus, when the registration of the departure-spot data and the destination data into the departure-spot/destination setting unit 14 is completed (when the answer is YES in S113), the guidance route searching unit 15 reads map data necessary for the vehicle to move from the departure spot to the destination into the buffer memory 11 from the CD-ROM 1, based on the departure-spot data and the destination data. At the same time, the guidance route searching unit 15 searches the optimum guidance route with the shortest distance given as an index, for example and causes the guidance route memory 16 to store a sequence of nodes forming the searched guidance route together with the first departure data and the rearmost destination data (S114). The respective node data stored in the guidance route memory 16 include coordinates of longitudes and latitudes.

If the number of nodes (including the departure-spot data and the destination data) forming a guidance route is $16^3$ at this time, then guidance route data are stored in the guidance route memory 16 as shown in FIG. 2.

Figure 7:
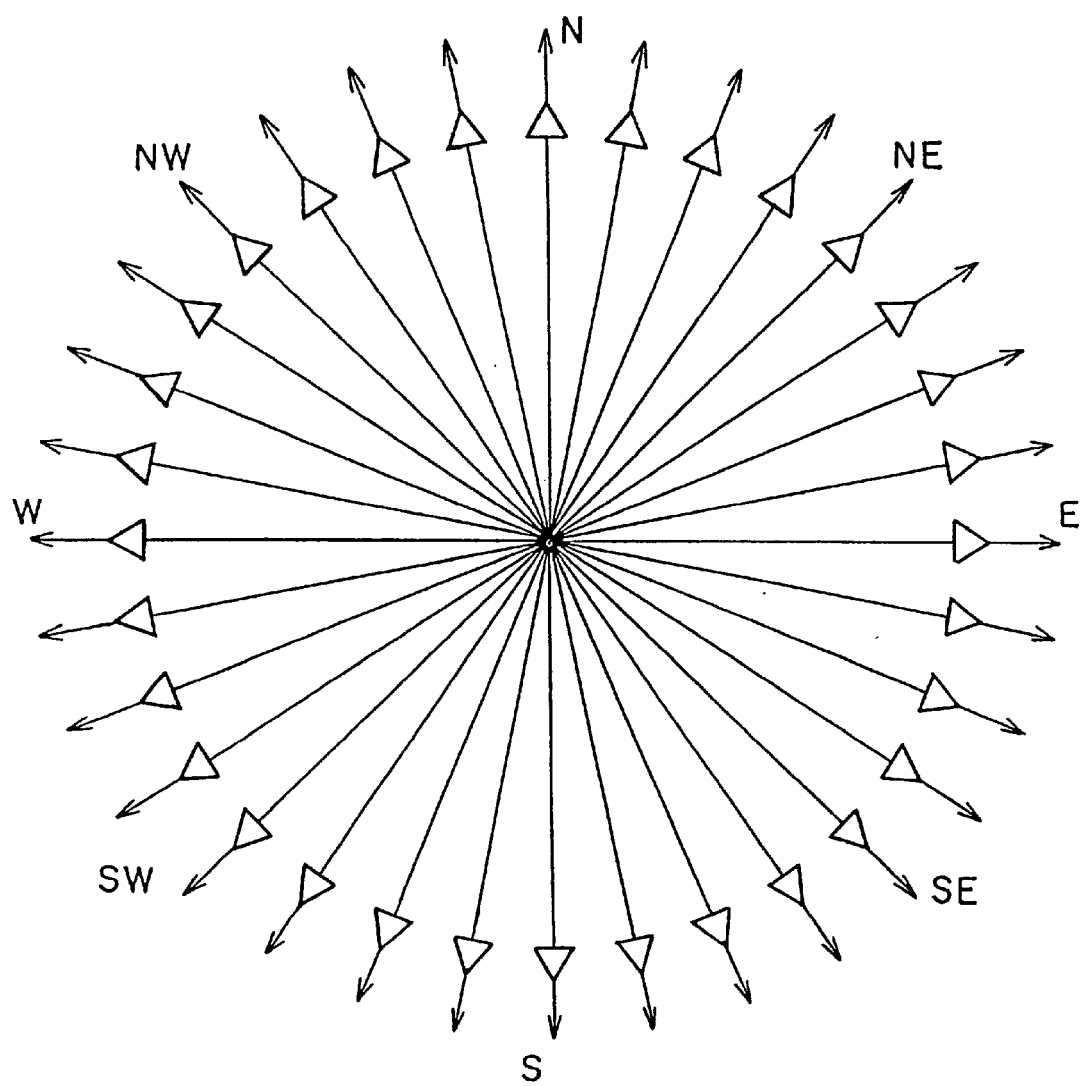
FIG. 7 is a view typically illustrating route marks employed in the present invention.

A description will now be made of symbol data about route marks. The guidance route drawing controller 17 stores symbol data about route marks drawn on a map therein as a route to be recommended. As shown in FIG. 7, the stored route marks are shaped in the form of triangles and are respectively prepared for 32 bearings to represent route directions or orientations. In the present embodiment, the two kinds of route data: data about the large route marks for the detailed map and data about the small route marks for the wide-area map are stored. The shape of each route mark varies little by little according to the direction to allow the user to easily observe it with a pattern represented by a limited number of dots.

A method of displaying the route marks on the display screen will now be described with reference to FIG. 6. When the user presses the start key on the operation panel 2, the map drawing controller 13 receives vehicle position data from the vehicle position detecting unit 3. Further, the map drawing controller 13 reads map data about the periphery of position coordinates of a vehicle into the buffer memory 11 from the CD-ROM 1 and draws a map image in the V-RAM 18 based on the vehicle position data so that the present vehicle position is placed in the center of the screen (S115, S116).

Thereafter, the guidance route drawing controller 17 makes a decision as to whether a displayed map belongs to either the detailed map or the wide-area map (S117). A map scale selection bit A is set from the result of decision. If the displayed map is found to be the detailed map, then A is set to 0 (A=0) and large route marks for the detailed map are drawn in the V-RAM 18 with directivity to the destination or the running of the vehicle (S118, S119). If the displayed map is found to be the wide-area map, then A is set to 1 (A=1) and small route marks for the wide-area map are drawn in the V-RAM 18 with directivity to the destination (S120, S121).

The guidance route drawing controller 17 judges maps drawn on scales of 1 to 12500 through to 1 to 100000 as detailed maps and maps drawn on scales of 1 to 400000 through 1 to 6400000 as wide-area maps, for example, from maps drawn on seven scales of 1 to 12500 through 1 to 6400000. Further, the guidance route drawing controller 17 determines or judges nodes approaching the destination from respective adjacent two nodes of adjacent-arranged nodes (departure spot and destination treated as nodes in the present embodiment) forming a guidance route according to the magnitudes of addresses stored in the guidance route memory 16. Thereafter, the guidance route drawing controller 17 may draw triangular route marks at intermediate points of links formed by respective two nodes, so as to be oriented toward the nodes near the destination. At this time, the large route marks for the detailed map are used if the displayed map is of the detailed map and the small route marks for the wide-area map are used if the displayed map is of the wide-area map.

Figure 8:
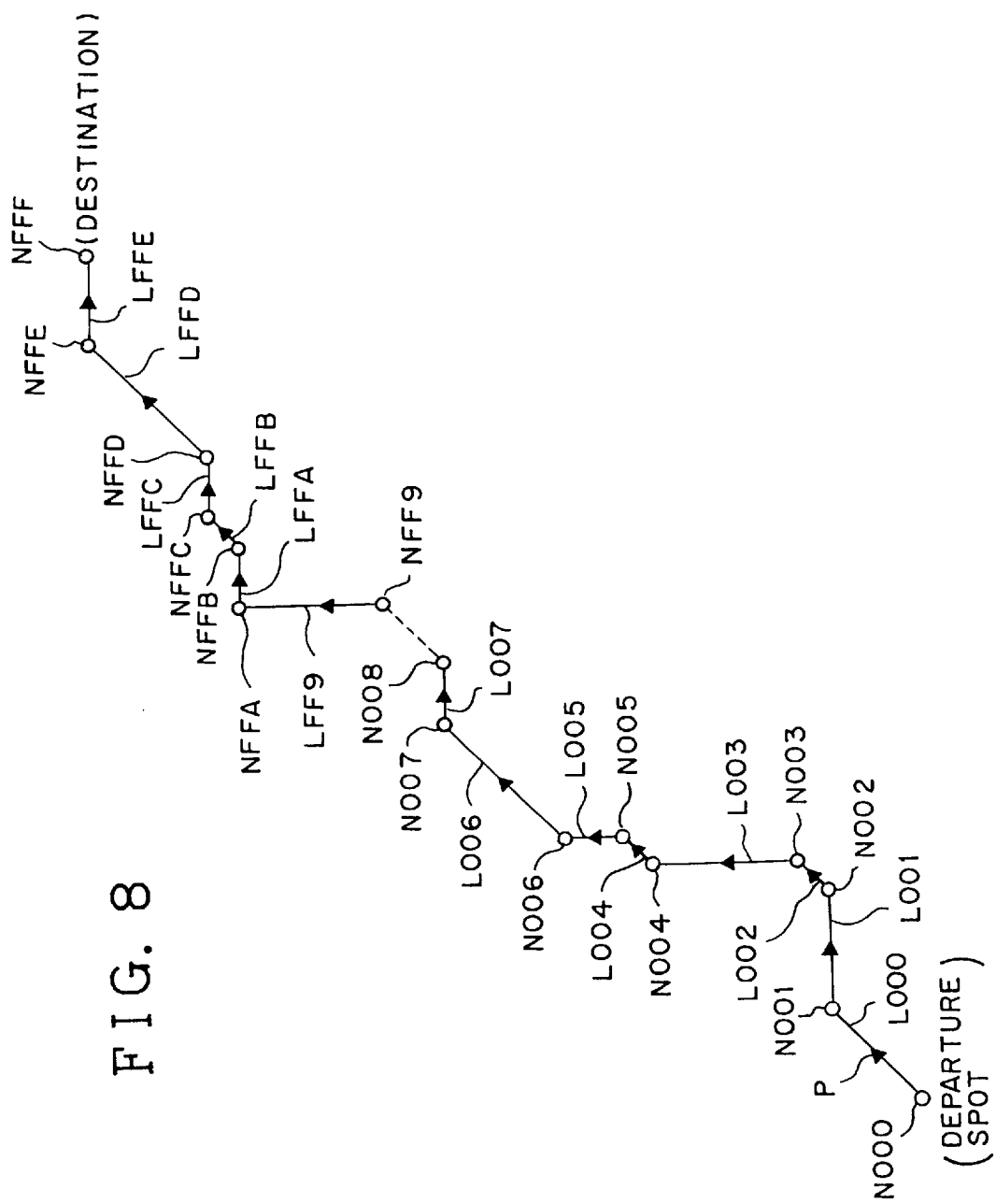
FIG. 8 is a view for describing the relationship between nodes and links employed in the present invention.

If the number of nodes forming a guidance route is $16^3$, then the number of links among the nodes exists $16^3-1$. If the nodes and the links are respectively represented as N000 through NFFF and L000 through LFFF, then a route chart is obtained as illustrated in FIG. 8.

A triangular route mark P is displayed at intermediate points of and respective link so as to be oriented toward the destination. If a single route mark is provided for each link, it then seems that the adjacent route marks approach each other as a map expands. However, this phenomenon does not occur as a matter of fact. As regards map data, the number of nodes and the number of links vary if maps to be displayed differ in scale from each other. Namely, small intersecting points are also regarded as nodes in a detailed map, whereas in a wide-area map, the small intersecting points are jumped or skipped over to some extent and only large intersecting points are regarded as nodes. Thus, each map data is constructed such that the length of each link between the adjacent nodes increases as the displayed map tends to take the wide-area map. Therefore, if a single route mark is displayed for each link in the case of maps drawn on any scale, then an interval between adjacent route marks is made adequate so that the user can set an easy-to-see screen.

Next, the map drawing controller 13 receives vehicle bearing data from the vehicle position detecting unit 3 and draws a vehicle position mark extending in the direction of indicating the vehicle bearing data on the center of a map drawn in the V-RAM 18 as shown in FIG. 3, for example (S122).

The video converter 19 converts an image drawn in the V-RAM 18 to a predetermined video signal and outputs it to the CRT display 4. The CRT display 4 displays the map image on the screen together with a route mark and the vehicle position mark placed in the center of the screen. Incidentally, large route marks are displayed on a detailed map as shown in FIG. 3, whereas small route marks are displayed on a wide-area map as illustrated in FIG. 4.

When the vehicle starts to move, the vehicle position detecting unit 3 detects a vehicle position and a vehicle bearing each time the vehicle is driven by a predetermined distance and outputs data about the vehicle position and bearing to the map drawing controller 13. Further, the vehicle position detecting unit 3 outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1 and draws a map image in the V-RAM 18 so that the center of the screen coincides with the vehicle position (S123, S124).

Subsequently, the guidance route drawing controller 17 judges the value of a bit A (S125). If A=0, i.e., a detailed map is displayed, then the guidance route drawing controller 17 reads nodes included in a map drawing area of the V-RAM 18 and lying around the vehicle position from the guidance route memory 16. Further, the guidance route drawing controller 17 draws each of the route marks for the detailed map at an intermediate position between the adjacent nodes so that each route mark be superposed on the map image drawn in the V-RAM 18 as shown in FIG. 3 (S126). If A≠0, i.e., a wide-area map is displayed, then the guidance route drawing controller 17 reads nodes around the vehicle position, which are included in the map drawing area of the V-RAM 18 from the guidance route memory 16. Further, the guidance route drawing controller 17 draws each of the route marks for the wide-area map at an intermediate position between the adjacent nodes so that each route mark be superposed on a map image drawn in the V-RAM 18 as shown in FIG. 4 (S127).

Next, the map drawing controller 13 draws a vehicle position mark extending in the direction of indicating vehicle bearing data on the center of a map drawn in the V-RAM 18, based on the vehicle bearing data (S128). At this time, the map image on the screen is scrolled by a predetermined distance in a state in which the vehicle position mark has been fixed to the center of the screen. When the scale is changed by the map scale changeover key on the operation panel 2 (S129), the routine procedure is returned to S116, followed by re-drawing of the map, resetting of the bit A, re-drawing of the route marks and re-drawing of the vehicle position mark.

The map image at the periphery of the vehicle position, the route marks and the vehicle position mark are repeatedly drawn below in the same manner as described above each time the vehicle is driven by the predetermined distance or the map scale is changed, whereby a display screen is brought up to date.

[Second embodiment]

Figure 9:
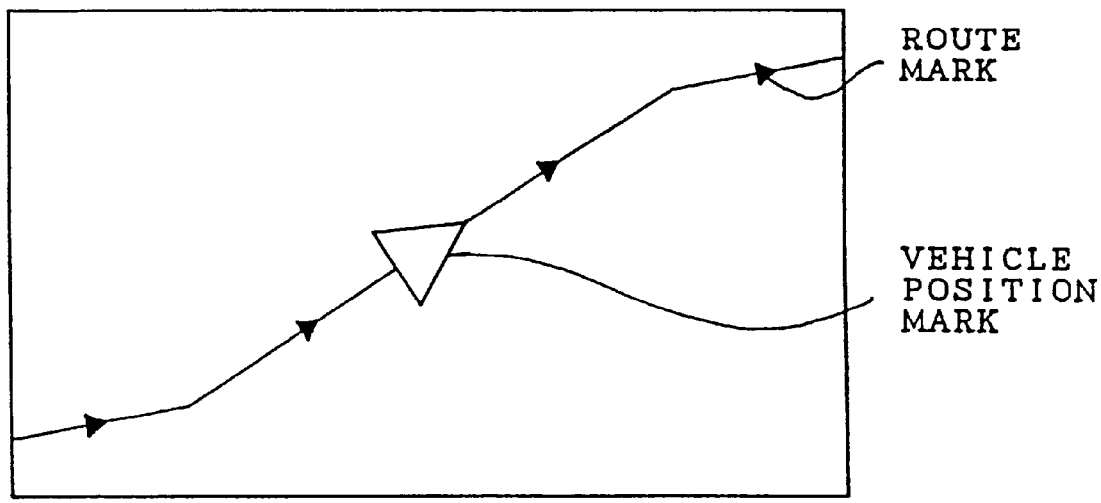
FIG. 9 is a view for describing a screen on which a detailed map employed in a second embodiment of the present invention is displayed.
Figure 10:
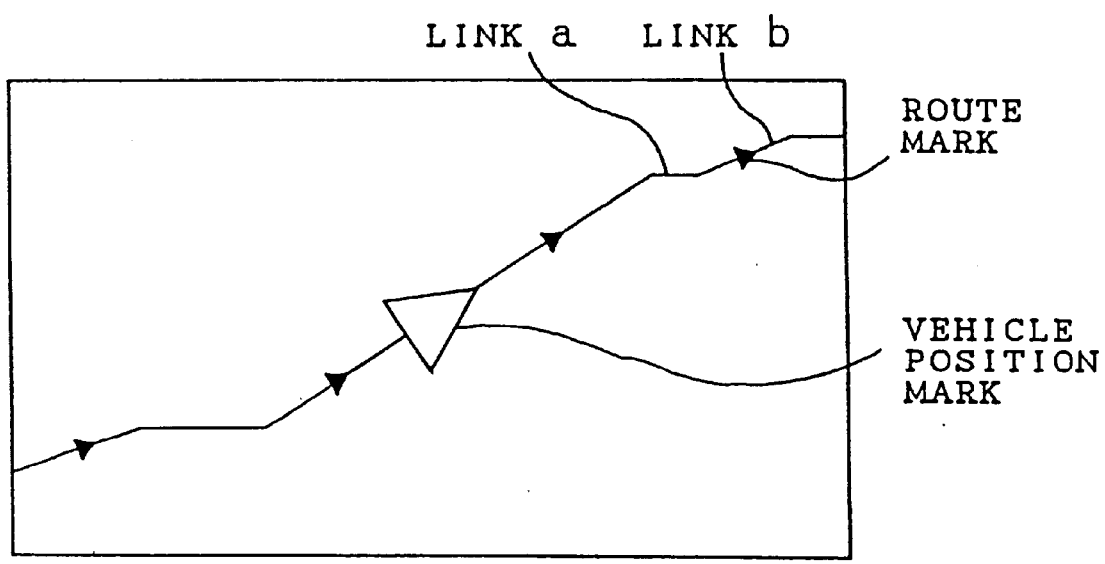
FIG. 10 is a view for describing a screen on which a wide-area map employed in the second embodiment is displayed.
Figure 11:
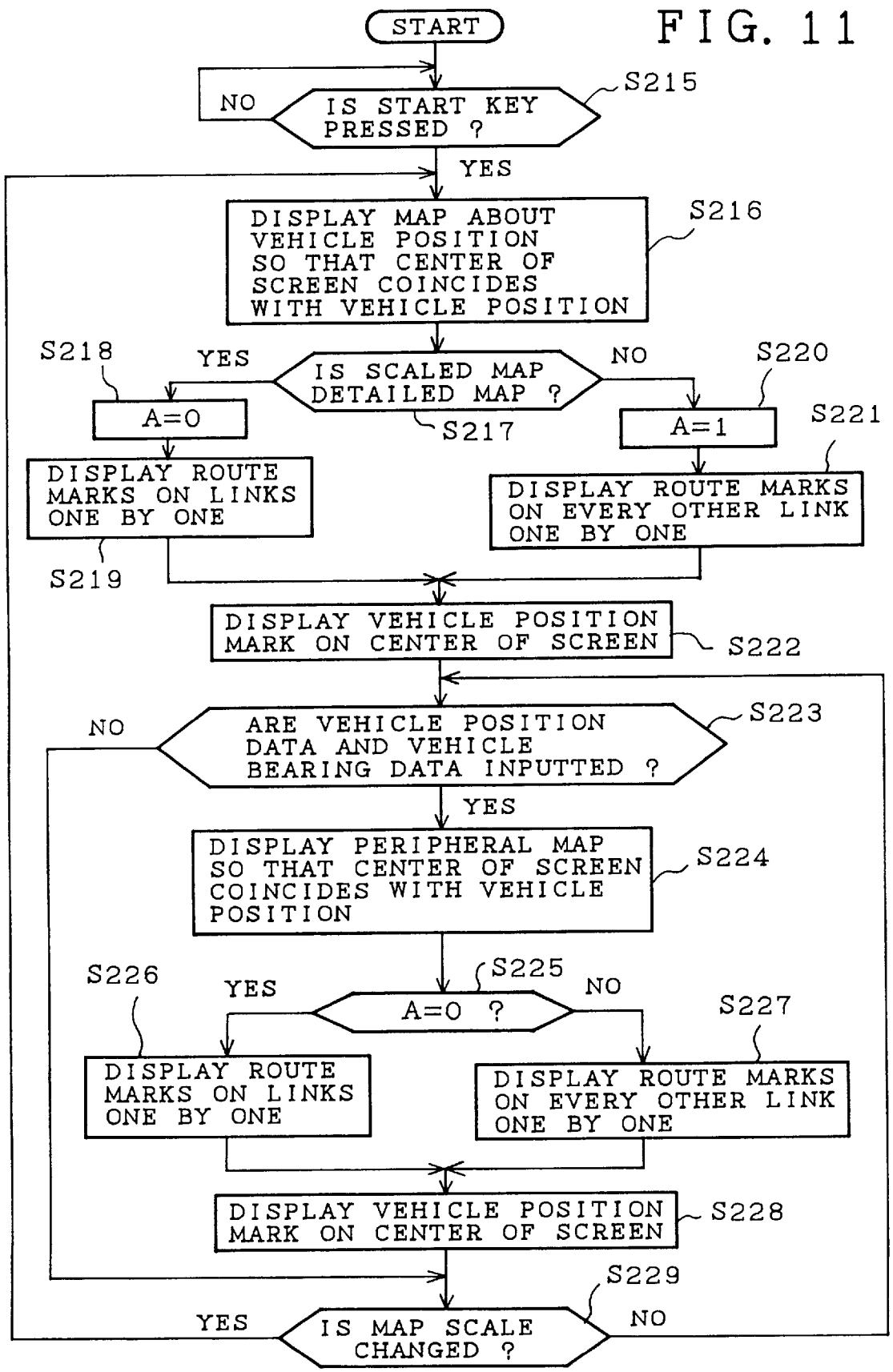
FIG. 11 is a flowchart for describing a map display operation executed in the second embodiment.

A second embodiment will now be described below. FIG. 9 is a view showing a screen on which a detailed map employed in the second embodiment is displayed. FIG. 10 is a view for describing a screen on which a wide-area map is displayed. FIG. 11 is a flowchart for describing a map display operation. A mobile navigation system showing the second embodiment is identical in structure to that showing the first embodiment except that a guidance route drawing controller is different in specific configuration from that employed in the first embodiment.

The operation of the second embodiment will now be described briefly. A user operates an operation panel 2 to set a departure spot and a destination. The navigation system performs route searching to search a route to be recommended between the departure spot and the destination. Thereafter, when a detailed map is displayed upon displaying a map, a single route mark per link is displayed as shown in FIG. 9. On the other hand, when a wide-area map is displayed, a route mark is displayed on alternate links as illustrated in FIG. 10. A link a is skipped over and a route mark is displayed on a link b as shown in FIG. 10, for example.

FIG. 11 is a flowchart for describing a basic operation of a navigation controller 10. The operation of the present embodiment will be described below with reference to FIGS. 11 and 5. In a manner similar to the first embodiment, the departure spot and the destination are first set and a guidance route is searched. When the user pressed the start key on the operation panel 2, a map drawing controller 13 receives vehicle position data from a vehicle position detecting unit 3 and reads data about a map at the periphery of the vehicle position into a buffer memory 11 from a CD-ROM 1. Next, the map drawing controller 13 draws a map image on a V-RAM 18 so that the center of a screen coincides with the present position of the vehicle (S215, S216).

Subsequently, a guidance route drawing controller 17 judges or determines whether a displayed map corresponds to either the detailed map or the wide-area map (S217). The guidance route drawing controller 17 sets a map scale selection bit A in accordance with the result of decision in the same manner as in the first embodiment. If the detailed map is displayed, then A is set to 0 (A=0). Further, in the V-RAM 18, one route mark having directivity to the destination is drawn at an intermediate point of each of the links forming a route to be recommended (S218, S219). If the wide-area map is displayed, then A is set to 1 (A=1). Further, one route mark having directivity to the destination is drawn at an intermediate point of every second link of the respective links forming the route to be recommended (S220, S221).

Next, the map drawing controller 13 receives vehicle bearing data from the vehicle position detecting unit 3 and draws a vehicle position mark extending in the direction of indicating the vehicle bearing data on the center of the map drawn in the V-RAM 18 (S222). At this time, a map display range has been determined in advance so that the center of the map coincides with the present position of the vehicle.

A video converter 19 converts the image drawn in the V-RAM 18 to a predetermined video signal and outputs it to a CRT display 4. As a result, the CRT display 4 displays a map image about the periphery of the vehicle together with the route marks and the vehicle position mark placed in the center of the screen thereof. When the displayed map is of the detailed map, a single route mark per link is displayed as shown in FIG. 9. On the other hand, when the displayed map is of the wide-area map, a route mark is displayed on alternate links as shown in FIG. 10.

When the vehicle starts to move, the vehicle position detecting unit 3 detects a vehicle position and a vehicle bearing each time the vehicle is driven by a predetermined distance and outputs data about the vehicle position and bearing to the map drawing controller 13. Further, the vehicle position detecting unit 3 outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1. Further, the map drawing controller 13 draws a map image in the V-RAM 18 so that the center of the screen coincides with the vehicle position (S223, S224).

Subsequently, the guidance route drawing controller 17 judges the value of the bit A (S225). If A=0, then the guidance route drawing controller 17 reads nodes included in a map drawing area of the V-RAM 18 and lying around the vehicle position from a guidance route memory 16. Further, the guidance route drawing controller 17 draws each of route marks at an intermediate point of each link so that each route mark is superposed on the map image drawn in the V-RAM 18 (S226). If A≠0, then the guidance route drawing controller 17 reads nodes included in the map drawing area of the V-RAM 18 and lying around the vehicle position from the guidance route memory 16. Further, the guidance route drawing controller 17 draws each of route marks at an intermediate point of every second link so that each route mark is superposed on the map image drawn in the V-RAM 18 (S227). Next, the map drawing controller 13 draws a vehicle position mark extending in the direction of indicating vehicle bearing data on the center of a map drawn in the V-RAM 18 (S228).

At this time, the map image on the screen is scrolled by a predetermined distance in a state in which the vehicle position has been held in the center of the screen. When the user operates a map scale changeover key on the operation panel 2 to change the scale (S229), the routine procedure is returned to S216, followed by re-execution of drawing of the map, setting of the bit A, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed, whereby a display screen is brought up to date.

Where a single link is too long to display route marks on the screen of the CRT display 4 when the detailed map is displayed, the guidance route drawing controller 17 may display two route marks in total so as to correspond to a route mark display position (corresponding to an intermediate point of each link) out of the screen and an intermediate point between nodes on both sides of the route mark display position. On the other hand, where adjacent two links are too long to display route marks on the screen of the CRT display 4 when the wide-area map is displayed, the guidance route drawing controller 17 may display route marks on links which would otherwise not have route marks shown.

In the present embodiment, the route marks are displayed every second link unconditionally when the wide-area map is displayed. However, when a link that appears immediately after a user has turned an intersecting point, is of a link with no route mark displayed thereon, it is hard for the user to understand which intersecting point the user should turn as far as the user sees the screen of the CRT display 4. Thus, when a guidance route passes through the intersecting point, the guidance route drawing controller 17 may draw a route mark on a link on the guidance route in the V-RAM 18, which appears immediately after the intersecting point, unconditionally. Further, the guidance route drawing controller 17 judges whether the guidance route passing through the intersecting point extends along the road or is out of the road (e.g., turns the intersecting point to the right or turns it to the left). When it is judged that the guidance route is other than along the road, a route mark may be drawn on a link on the guidance route in the V-RAM 18, which appears immediately after the intersecting point.

In the present embodiment, the route marks are displayed on every link. However, two or more route marks may be displayed on a single link.

Figure 12:
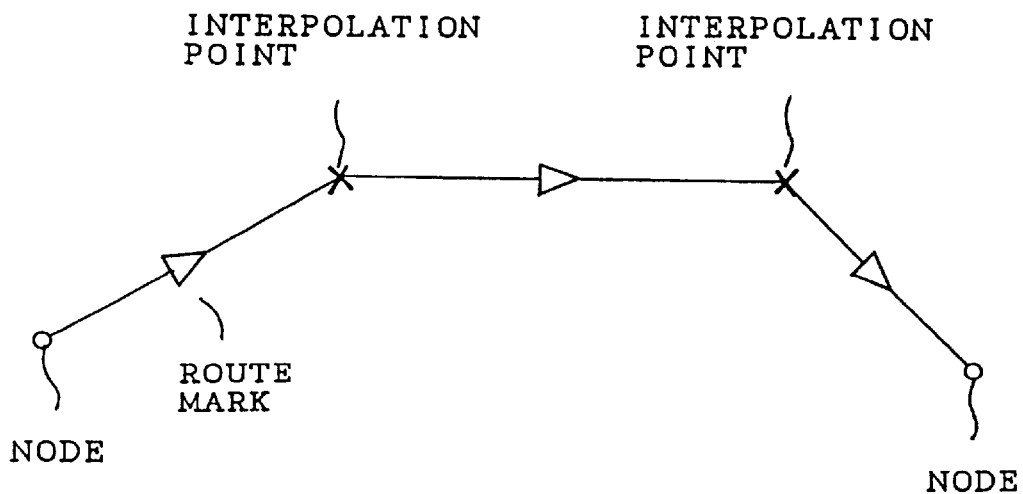
FIG. 12 is a view for explaining interpolation points employed in the present invention.

A single link is formed by two nodes. However, interpolation points for representing a curve of a road exist between a normal node and a node as shown in FIG. 12. Therefore, in the V-RAM 18, a route mark may be drawn at an intermediate point of a section between the node and the interpolation point and an intermediate point of a section between the interpolation points. When the wide-area map is displayed, route marks may be drawn every second section.

[Third embodiment]

Figure 13:
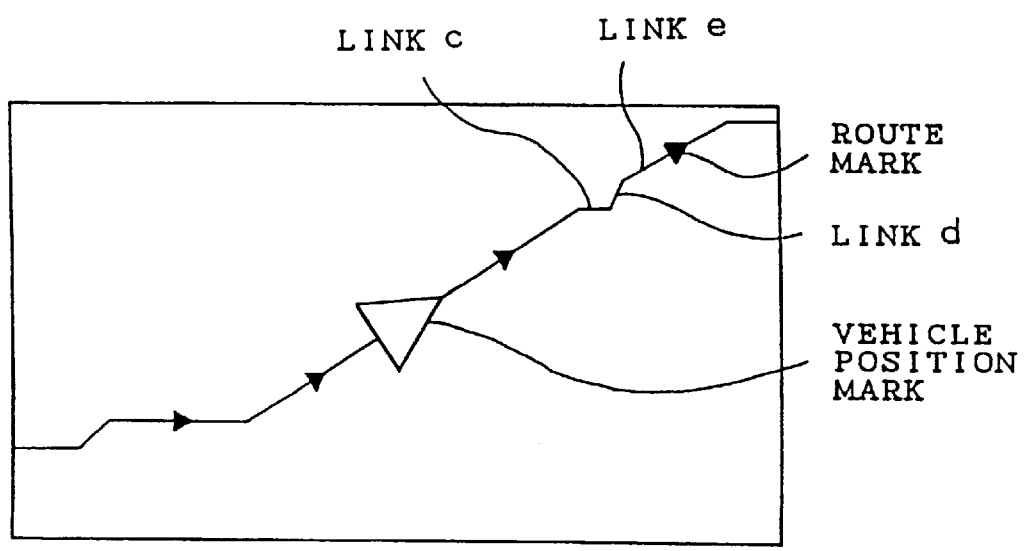
FIG. 13 is a view for describing a screen on which a wide-area map employed in a third embodiment of the present invention is displayed.
Figure 14:
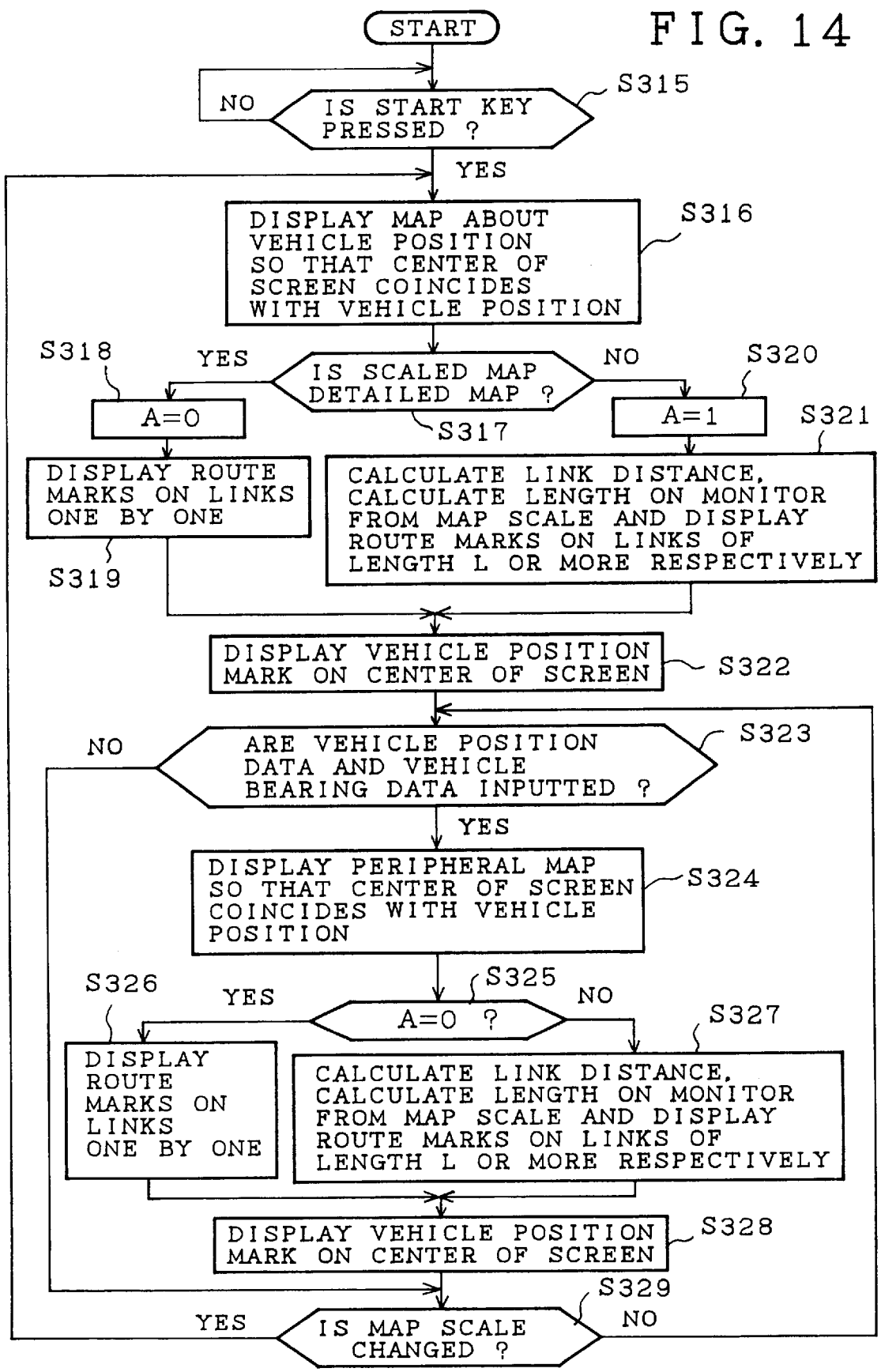
FIG. 14 is a flowchart for describing a map display operation executed in the third embodiment of the present invention.

A third embodiment of the present invention will now be described. FIG. 13 is a view for describing a screen on which a wide-area map employed in the third embodiment is displayed. FIG. 14 is a flowchart for describing a map display operation. A navigation system showing the third embodiment is identical in structure to that showing the first embodiment except that a guidance route drawing controller is different in specific configuration from that employed in the first embodiment.

The operation of the third embodiment will now be described briefly. A user operates an operation panel 2 to set a departure spot and a destination. The navigation system performs route searching to search a route to be recommended between the departure spot and the destination. When a displayed map is of a detailed map, a single route mark per link is displayed as shown in FIG. 9 in a manner similar to the second embodiment. On the other hand, when the displayed map is of a wide-area map, route marks are affixed only to links each having a certain measure of length on the screen as illustrated in FIG. 13, dissimilarly to the second embodiment.

A method of determining the length of each of links on the screen, includes calculating a link's distance, determining an apparent length from the calculated distance and a map scale and setting a link having a length of less than a predetermined length as a short link. No route mark is applied to the short link and the route mark is affixed to a long link alone.

The operation of the present embodiment will now be described with reference to FIGS. 14 and 5. Similar to the first embodiment, a departure spot and a destination are first set and a guidance route is searched. Further, information about the searched guidance route is stored in a guidance route memory 16 (see S101 through S114 in FIG. 5). Next, when a user presses a start key on an operation panel 2, a map drawing controller 13 receives vehicle position data from a vehicle position detecting unit 3 and reads map data regarding the periphery of coordinates of a vehicle position into a buffer memory 11 from a CD-ROM 1. Further, the map drawing controller 13 draws a map image on a V-RAM 18 so that the center of the screen coincides with the present position of the vehicle (S315, S316).

Subsequently, a guidance route drawing controller 17 makes a decision as to whether a displayed map is either a detailed map or a wide-area map (S317). The guidance route drawing controller 17 sets a map scale selection bit A based on the result of this decision. If the displayed map is found to be the detailed map, then the guidance route drawing controller 17 sets the map scale selection bit A to 0 (A=0) and draws one route mark having directivity to a destination to an intermediate point of each of links forming a route to be recommended in the V-RAM 18 (S318, S319). If the displayed map is found to be the wide-area map, then the guidance route drawing controller 17 sets the map scale selection bit A to 1 (A=1) and calculates a distance or length of each of the links forming the recommended route. An apparent length of each link on the display screen is calculated based on the calculated distance and a displayed map scale. A single route mark having directivity to the destination is drawn at an intermediate point of each link whose apparent length is more than or equal to L in the V-RAM 18 (S320, S321).

More specifically, assuming now that coordinates of nodes N1 and N2 forming a link are represented as (X1, Y1) and (X2, Y2), for example, the guidance route drawing controller 17 calculates an actual length L of the link as follows:

$$L=((X1-X2)^2+(Y1-Y2)^2)^{1/2}$$

If a map scale is represented as 1/400000, for example, then an apparent length M is obtained as follows:

$$M=L/400000$$

Therefore, route marks are affixed only to links given provided that M≧L.

Next, the map drawing controller 13 receives vehicle bearing data from the vehicle position detecting unit 3 and draws a vehicle position mark on the center of the map drawn in the V-RAM 18 in the direction of indicating the vehicle bearing data (S322).

A video converter 19 converts the image drawn in the V-RAM 18 to a predetermined video signal and outputs it to a CRT display 4. As a result, the CRT display 4 displays a map image about a vehicle position thereon together with route marks so that the vehicle position is centrally placed. When the detailed map is displayed, a single route mark is applied to each link as shown in FIG. 9. On the other hand, when the wide-area map is displayed, route marks are affixed to links whose lengths M are more than or equal to L as illustrated in FIG. 13. For example, a route mark is affixed to a link e corresponding to a long link and no route marks are applied to links c and d corresponding to short links.

When the vehicle starts to run, the vehicle position detecting unit 3 detects a vehicle position and a vehicle bearing each time the vehicle is driven a predetermined distance. The vehicle position detecting unit 3 outputs data about the vehicle position and bearing to the map drawing controller 13. Further, the vehicle position detecting unit 3 outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1. Further, the map drawing controller 13 draws a map image in the V-RAM 18 so that the center of the screen coincides with the vehicle position (S323, S324).

Thereafter, the guidance route drawing controller 17 judges the value of the bit A (S325). If A=0, then the guidance route drawing controller 17 reads nodes included in a map drawing area of the V-RAM 18 and lying around the vehicle position from the guidance route memory 16 as data. Further, the guidance route drawing controller 17 draws each of route marks at an intermediate point of each link so that each route mark be superposed on the map image drawn in the V-RAM 18 (S326). If A≠0, then the guidance route drawing controller 17 calculates a distance of each link and determines an apparent length M of each link on the display screen based on the calculated distance and the displayed map scale. A single route mark is affixed to an intermediate point of each link (such as a link e in FIG. 13) whose length M is more than or equal to L and no route marks are set to links (such as the links c and d in FIG. 13) whose lengths M are less than L (S327).

Next, the map drawing controller 13 draws a vehicle position mark on the center of the map drawn in the V-RAM 18 in the direction of indicating the vehicle bearing data, based on the vehicle bearing data (S328). At this time, the map image on the screen is scrolled by a predetermined distance in a state in which the vehicle position has been held in the center of the map. When a user operates a map scale changeover key on the operation panel 2 to change the scale (S329), the routine procedure is returned to S316, followed by re-execution of drawing of the map, setting of the bit A, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed.

When the displayed map is of the wide-area map, no route marks are affixed to links whose apparent lengths are short. However, when no route mark is applied to a link that appears immediately after a user has turned an intersecting point (when no route mark is displayed because the link appearing immediately after the user has turned the intersecting point, is short), it is hard for the user to understand which intersecting point the user must turn on the screen of the CRT display 4. Thus, when a guidance route passes through the intersecting point, the guidance route drawing controller 17 judges whether the guidance route passing through the intersecting point extends along the road or is off of the road (e.g., turns the intersecting point to the right or turns it to the left). When it is judged that the guidance route is other than along the road, a route mark may be drawn on a link which appears immediately after the user has turned the intersecting point in the V-RAM 18.

When the guidance route passes through the intersecting point, a route mark may be drawn on a link that appears immediately after the passage of the guidance route therethrough regardless of the apparent length of the link.

[Fourth embodiment]

Figure 15:
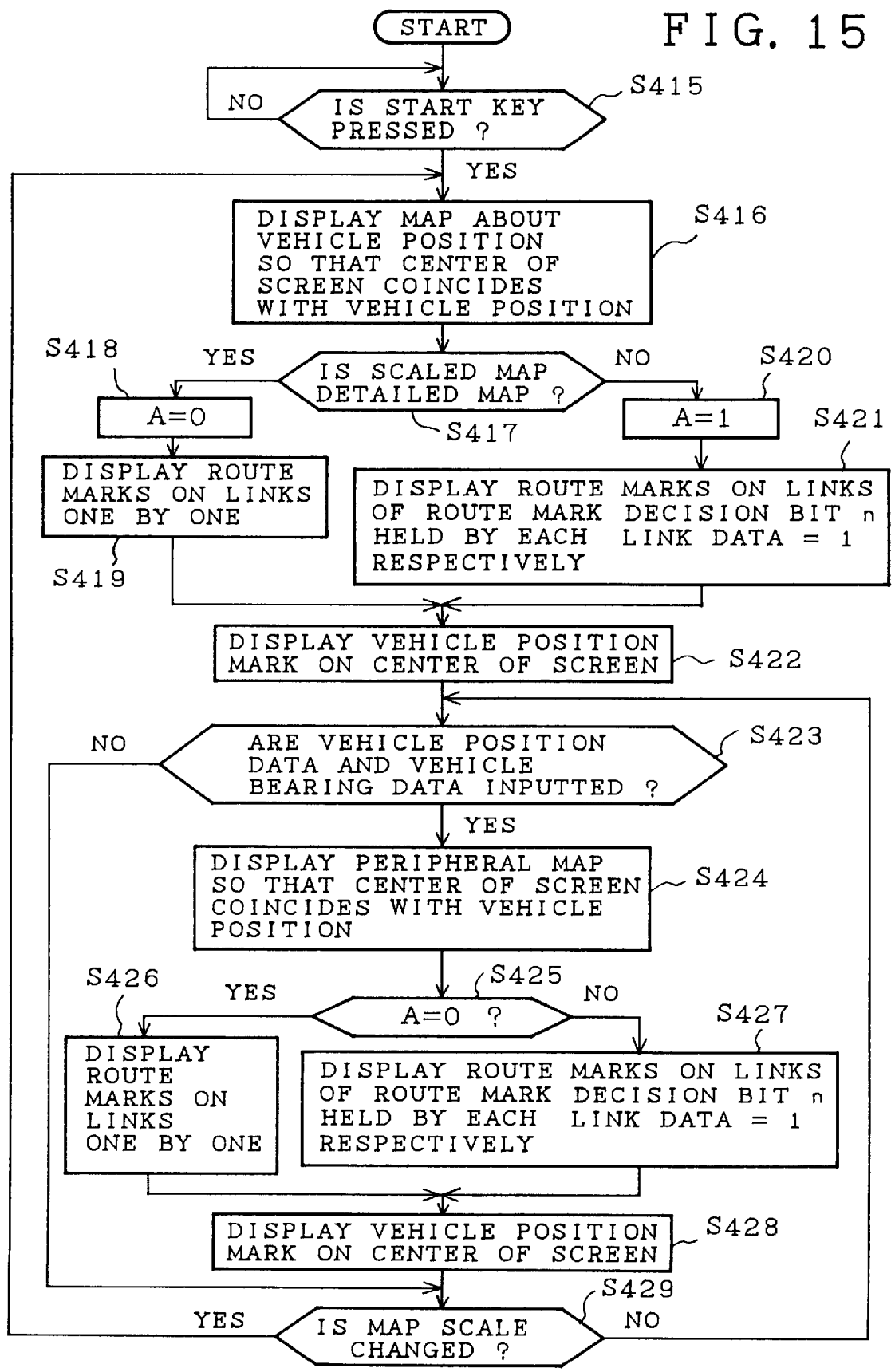
FIG. 15 is a flowchart for describing a map display operation executed in a fourth embodiment of the present invention.
Figure 16:
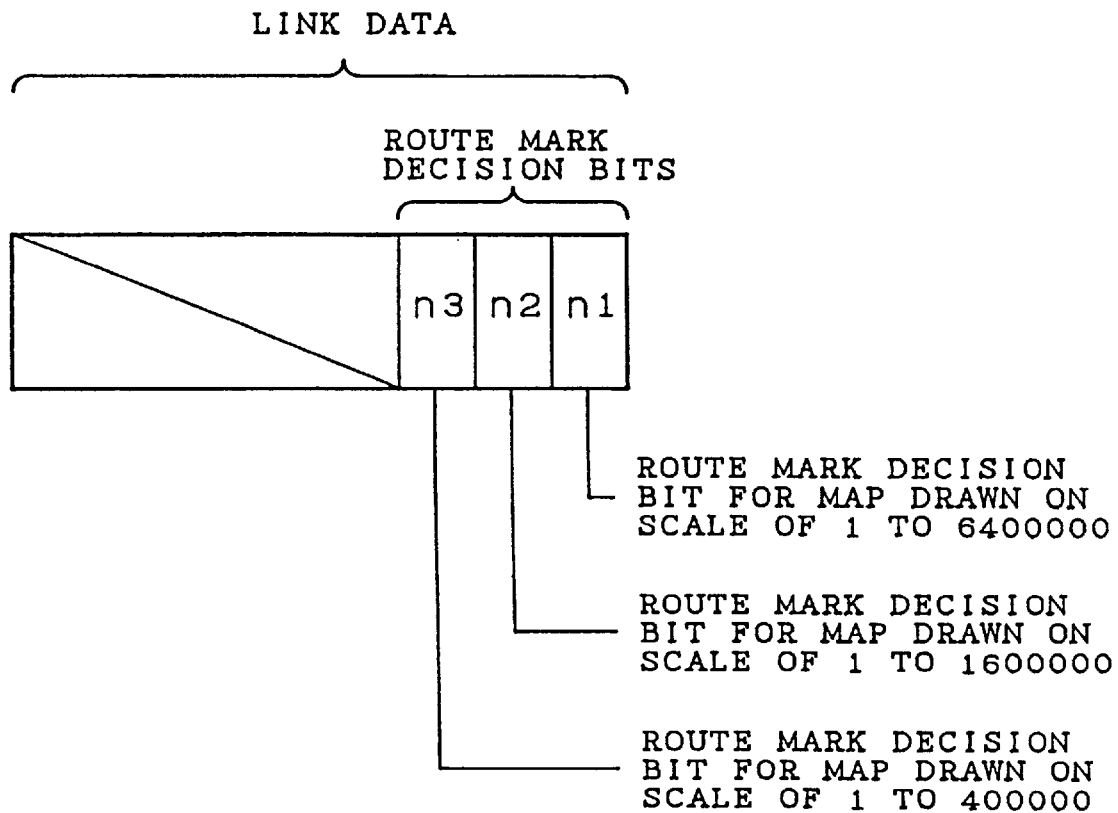
FIG. 16 is a view typically showing link data employed in the fourth embodiment of the present invention.

A fourth embodiment of the present invention will now be described. FIG. 15 is a flowchart for describing a map display operation executed in the fifth embodiment. FIG. 16 is a view for describing link data. A navigation system showing the fourth embodiment is identical in structure to that showing the first embodiment except that a guidance route drawing controller is different in specific configuration from that employed in the first embodiment.

The operation of the fourth embodiment will now be described briefly. A user operates an operation panel 2 to set a departure spot and a destination. The navigation system performs route searching to search a route to be recommended between the departure spot and the destination. When a displayed map is of a detailed map upon displaying a map, the application of each route mark to its corresponding link is performed in a manner similar to the second embodiment, i.e., a single route mark per link is displayed as shown in FIG. 9. On the other hand, when the displayed map is of a wide-area map, the application of each route mark to its corresponding link is made in a manner similar to the third embodiment, i.e., route marks are not affixed to short links but are affixed only to links each having a certain measure of length as illustrated in FIG. 13.

In the present embodiment, route mark decision bits n are assigned to all the link data of the CD-ROM 1 so as to correspond to respective scales. The three most significant bits of the link data n1, n2 and n3 respectively correspond to route mark decision bits n indicative of maps drawn on scales of 1 to 6400000, 1 to 1600000 and 1 to 400000. A route mark decision bit of "0" is assigned to data about short links whose lengths are less than L. A route mark decision bit of "1" is assigned to data about links whose lengths are long but more than or equal to L. When the value of each bit is "0", no route mark is displayed. When the bit value is "1", a route mark is displayed.

The operation of the present invention will be described below with reference to FIGS. 15 and 5. First, a departure spot and a destination are set and a guidance route is searched similarly to the first embodiment. Further, information about the searched guidance route is stored in a guidance route memory 16 (S101 through S114 in FIG. 5). When an operator presses a start key on the operation panel 2, a map drawing controller 13 receives vehicle position data from a vehicle position detecting unit 3. Further, the map drawing controller 13 reads map data regarding the periphery of coordinates of a vehicle position into a buffer memory 11 from a CD-ROM 1. Furthermore, the map drawing controller 13 draws a map image on a V-RAM 18 so that the center of the screen coincides with the present position of a vehicle (S415, S416 in FIG. 15).

Subsequently, a guidance route drawing controller 17 makes a decision as to whether a displayed map is either a detailed map or a wide-area map (S417). The guidance route drawing controller 17 sets a map scale selection bit A based on the result of this decision. When the detailed map is displayed, the guidance route drawing controller 17 sets the map scale selection bit A to 0 (A=0). Further, the guidance route drawing controller 17 draws one route mark having directivity to a destination to an intermediate point of each of links forming a route to be recommended in the V-RAM 18 (S418, S419). When the wide-area map is displayed, the guidance route drawing controller 17 sets the map scale selection bit A to 1 (A=1) and reads route mark decision bits n for the links forming the recommended route. A single route mark having directivity to the destination is set to an intermediate point of each link in which the route mark decision bit n is "1". When the route mark decision bit is other than "1" (i.e., n=0), no route mark is affixed to that link (S420, S421).

Next, the map drawing controller 13 receives vehicle bearing data from the vehicle position detecting unit 3 and draws a vehicle position mark extending in the direction of indicating the vehicle bearing data on the center of the map drawn in the V-RAM 18.

A video converter 19 converts the image drawn in the V-RAM 18 to a predetermined video signal and outputs it to a CRT display 4. As a result, the CRT display 4 displays a map image about a vehicle position thereon together with route marks and the vehicle position mark placed in the center of the screen. When the detailed map is displayed, a single route mark is affixed to each link as shown in FIG. 9. On the other hand, when the wide-area map is displayed, a single route mark is affixed to each link of bit n=1 as illustrated in FIG. 13.

When the vehicle starts to move, the vehicle position detecting unit 3 detects a vehicle position and a vehicle bearing each time the vehicle is driven by a predetermined distance. The vehicle position detecting unit 3 outputs data about the vehicle position and bearing to the map drawing controller 13. Further, the vehicle position detecting unit 3 outputs the vehicle position data to the guidance route drawing controller 17.

When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1. Further, the map drawing controller 13 draws a map image in the V-RAM 18 so that the center of the screen coincides with the vehicle position (S423, S424). Thereafter, the guidance route drawing controller 17 judges the value of the bit A (S425). If A=0, then the guidance route drawing controller 17 reads nodes included in a map drawing area of the V-RAM 18 and lying around the vehicle position from the guidance route memory 16 as data. Further, the guidance route drawing controller 17 draws each of route marks at an intermediate point of each link so that each route mark is superposed on the map image drawn in the V-RAM 18 (S426).

If A≠0, then the guidance route drawing controller 17 reads route mark decision bits n for the respective links and displays a route mark at an intermediate point of a link of n=1 (S427). Next, the map drawing controller 13 draws a vehicle position mark extending in the direction of indicating the vehicle bearing data on the center of the map drawn in the V-RAM 18, based on the vehicle bearing data (S428). At this time, the map image on the screen is scrolled by a predetermined distance in a state in which the vehicle position has been fixed to the center of the map. When the user operates a map scale changeover key on the operation panel 2 to change the scale (S429), the routine procedure is returned to S416, followed by re-execution of drawing of the map, setting of the bit A, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed.

In the third and fourth embodiments, the single route mark is affixed to each link. However, two or more route marks may be applied to a single link.

A single link is formed by two nodes, for example. However, interpolation points for representing a curve of a road exist between a normal node and a node as shown in FIG. 12. When the detailed map is displayed, route marks may be displayed one by one at an intermediate point between the node and the interpolation point and an intermediate point between the interpolation points without affixing the route marks to their corresponding links. When the wide-area map is displayed, route marks may be respectively displayed on a section or segment between the node and the interpolation point and a segment between the interpolation points, whose lengths of segments are more than or equal to a predetermined length.

In the third and fourth embodiments, no route marks are affixed to links whose apparent lengths are less than L when the wide-area map is displayed. However, the reference length L may be changed for each map scale. Reference link lengths are set as in the case where L1 is set to a map drawn on a scale of 1 to 6400000, L2 is set to a map drawn on a scale of 1 to 1600000 and L3 is set to a map drawn on a scale of 1 to 400000, . . . , for example. In this condition, route marks may be applied to links whose lengths are longer than the reference link lengths, without affixing route marks to links whose lengths are shorter than the reference link lengths.

Further, each reference link length may be changed according to the preferences of the user or other displays in the map.

In the fourth embodiment, where a single link is too long to display route marks on the screen of the CRT display 4 when the detailed map is displayed, the guidance route drawing controller 17 may display two route marks in total so as to correspond to a route mark display position (corresponding to an intermediate point of each link) out of the screen and an intermediate point between nodes on both sides of the route mark display position. On the other hand, where no route marks are successively graphically affixed to short links (e.g., links of route mark decision bit n=0) on the screen of the CRT display 4 when the wide-area map is displayed, the guidance route drawing controller 17 may display route marks on links to which the route marks are not originally affixed.

In the fourth embodiment, the single route mark is affixed to each link. However, two or more route marks may be affixed to a single link.

In the fourth embodiment as well, the route marks are displayed one by one at an intermediate point of a segment between a node and an interpolation point and an intermediate point of a segment between adjacent interpolation points without affixing the route marks to their corresponding links. Further, route mark decision bits n corresponding to a plurality of segments forming respective links are respectively stored in the CD-ROM 1. When the wide-area map is displayed, a route mark may be affixed to a segment of n=1 of the plurality of segments.

In the fourth embodiment, no route marks are applied to the links indicative of n (route mark decision bit)=0 when the displayed map is of the wide-area map. However, when no route mark is affixed to a link that appears immediately after a user has turned an intersecting point (when the route mark decision bit n of the link that appears immediately after the user has turned the intersecting point, is 0 (n=0)), it is hard for the user to understand which intersecting point the user should turn as far as the user sees the display screen of the CRT display 4. Therefore, the guidance route drawing controller 17 may display route marks unconditionally when the guidance route passes through the intersection point.

Further, the guidance route drawing controller 17 makes a decision as to whether the guidance route passing through the intersecting point extends along the road or is out of the road (e.g., turns the intersecting point to the right or turns it to the left). When it is judged that the guidance route is other than along the road, route marks may be drawn in the V-RAM 18 even if the route mark decision bit n is 0.

[Fifth embodiment]

Figure 17:
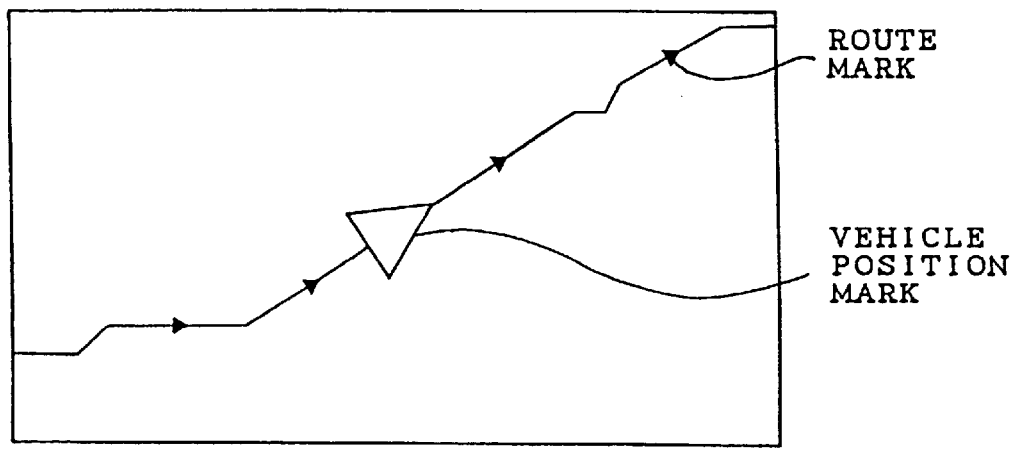
FIG. 17 is a view for explaining a screen on which a wide-area map employed in a fifth embodiment of the present invention is displayed.
Figure 18:
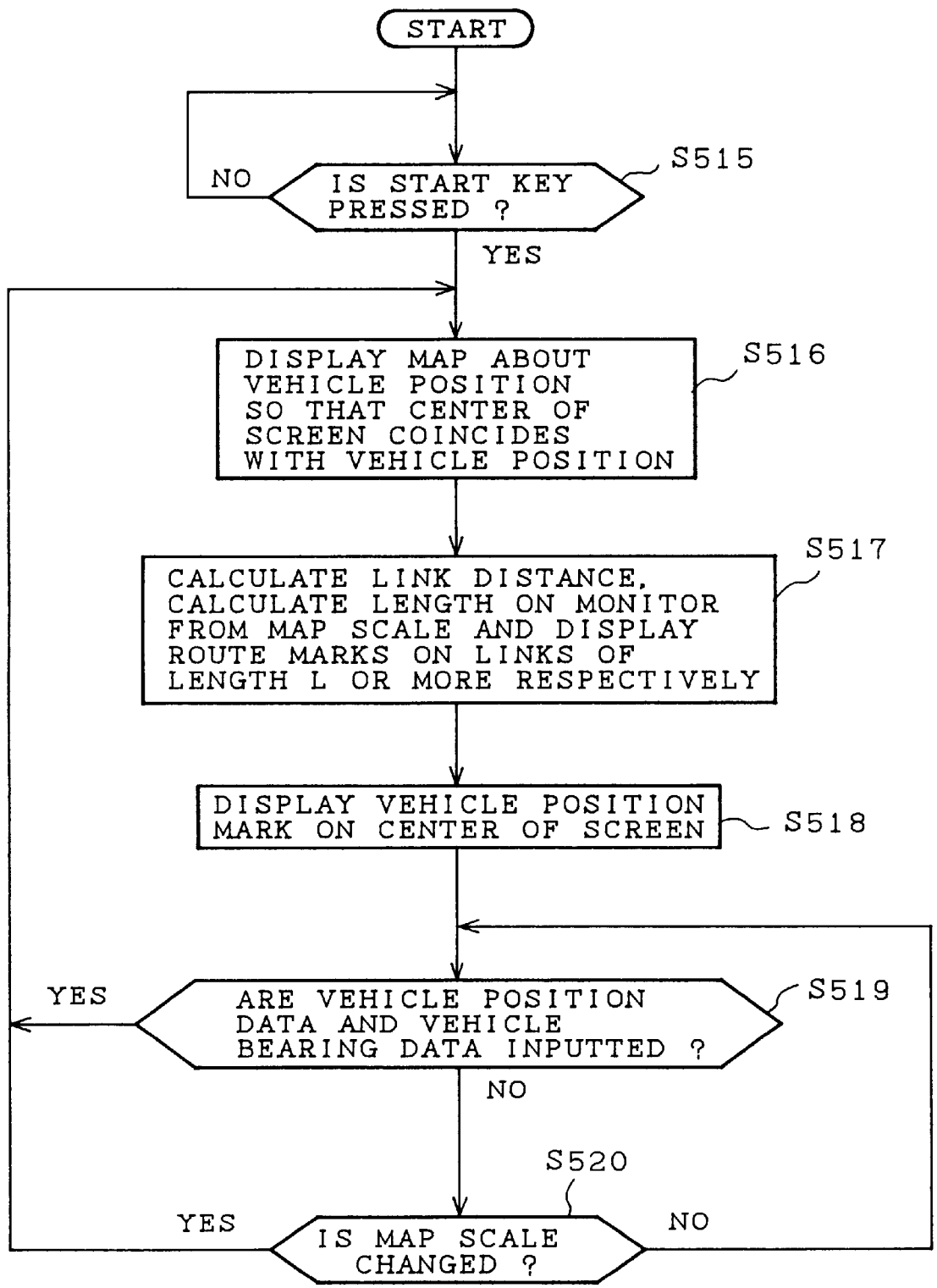
FIG. 18 is a flowchart for describing a map display operation executed in the fifth embodiment.

A fifth embodiment of the present invention will now be described. FIG. 17 is a view for describing a display screen. FIG. 18 is a flowchart for describing a map display operation. A navigation system showing the fifth embodiment is identical in structure to that showing the first embodiment except that a guidance route drawing controller is different in specific configuration from that employed in the first embodiment.

The operation of the fifth embodiment will now be described briefly. A user operates an operation panel 2 to set a departure spot and a destination. The navigation system performs route searching to search a route to be recommended between the departure spot and the destination. Upon displaying a map, route marks are not applied to short links but are affixed only to links each having a certain measure of length as illustrated in FIG. 17. In the present embodiment, the above route mark affixing process is effected on the all the scales without drawing a distinction between a detailed map and a wide-area map. For example, actual link's distances or lengths are calculated and an apparent length of each link is calculated based on each calculated distance and a displayed map scale. Route marks are displayed only on links whose lengths are more than or equal to a predetermined length.

The operation of the present embodiment will now be described with reference to FIGS. 18 and 5. Similar to the first embodiment, a departure spot and a destination are first set and a guidance route is searched. Further, information about the searched guidance route is stored in a guidance route memory 16 (S101 through S114 in FIG. 5). Next, when the user presses a start key on the operation panel 2, a map drawing controller 13 receives vehicle position data from a vehicle position detecting unit 3 and reads map data regarding the periphery of coordinates of a vehicle position into a buffer memory 11 from a CD-ROM 1. Further, the map drawing controller 13 draws a map image on a V-RAM 18 so that the center of the screen coincides with the present position of a vehicle (S515, S516 in FIG. 18).

Subsequently, a guidance route drawing controller 17 calculates distances or lengths of respective links forming the recommended route and determines apparent lengths of the links on the display screen from the calculated distances and the displayed map scale. Further, the guidance route drawing controller 17 draws a single route mark having directivity to the destination at an intermediate point of each link whose length is more than or equal to L in the V-RAM 18 (S517).

Described specifically, assuming now that coordinates of nodes N1 and N2 forming each link are represented as (X1, Y1) and (X2, Y2), for example, the guidance route drawing controller 17 calculates a length L of the link as follows:

$$L = ((X1-X2)^2 + (Y1-Y2)^2)^{1/2}$$

Thus, if a map scale is represented as S, then an apparent link length M is obtained as follows:

$$M = L \times S$$

If a map scale is represented as 1 to 400000, for example, then the apparent length M is obtained as follows:

$$M = L \times (1/400000)$$

Now, the guidance route drawing controller 17 displays route marks only on links given provided that M≧L.

Next, the map drawing controller 13 receives vehicle bearing data from the vehicle position detecting unit 3 and draws a vehicle position mark on the center of the map drawn in the V-RAM 18 in the direction of indicating the vehicle bearing data (S518).

A video converter 19 converts the image drawn in the V-RAM 18 to a predetermined video signal and outputs it to a CRT display 4. As a result, the CRT display 4 displays a map image about a vehicle position thereon together with route marks so that the vehicle position is centrally placed. According to the above processing, the route marks are affixed to the links whose apparent lengths M are more than or equal to L one by one as shown in FIG. 17.

Now, when the vehicle starts to move (S519) or the user operates a map scale changeover key on the operation panel 2 to change a map scale (S520), the map drawing controller 13 reads map data about the periphery of the vehicle position into the buffer memory 11 from the CD-ROM 1. Further, the map drawing controller 13 draws a map image in the V-RAM 18 so that the center of the map coincides with the vehicle position (S516).

Next, the guidance route drawing controller 17 reads nodes included in a map drawing area of the V-RAM 18 and lying around the vehicle position from a guidance route memory 16 as data. Further, the guidance route drawing controller 17 calculates distance or lengths of respective links and determines apparent link lengths on the screen from the calculated lengths and the displayed map scale. Furthermore, the guidance route drawing controller 17 superposes route marks on the map image of the V-RAM 18 so that they be affixed to intermediate points of links whose apparent lengths M are more than or equal to L (S517). Next, the map drawing controller 13 draws a vehicle position mark extending in the direction of indicating vehicle bearing data on the center of the map drawn in the V-RAM 18, based on the vehicle bearing data (S518).

The map image at the periphery of the vehicle position, the route marks and the vehicle position mark are repeatedly drawn below in the same manner as described above each time the vehicle is driven by the predetermined distance or the map scale is changed.

When no route marks are successively graphically affixed to links whose apparent lengths are short, on the display screen of the CRT display 4, the guidance route drawing controller 17 may affix route marks on links to which the route marks are not originally affixed. At this time, the guidance route drawing controller 17 may apply route marks to every second short link in the V-RAM 18.

A single route mark is affixed to each link but two or more route marks may be applied to a single link.

A single link is formed by two nodes, for example. However, interpolation points for representing a curve of a road exist between a normal node and a node as shown in FIG. 12. Route marks may be displayed one by one at an intermediate point between the node and the interpolation point and an intermediate point between the interpolation points without affixing the route marks to their corresponding links. Further, route marks may be respectively displayed on a section or segment between the node and the interpolation point and a segment between the interpolation points, whose apparent lengths of segments are more than or equal to a predetermined length.

Further, no route marks are affixed to links whose apparent lengths are less than L. However, a reference length L may be changed for each map scale. Reference link lengths are set as in the case where L1 is set to a map drawn on a scale of 1 to 6400000, L2 is set to a map drawn on a scale of 1 to 1600000, L3 is set to a map drawn on a scale of 1 to 400000, L4 is set to a map drawn on a scale of 1 to 100000, L5 is set to a map drawn on a scale of 1 to 50000, L6 is set to a map drawn on a scale of 1 to 25000, L7 is set to a map drawn on a scale of 1 to 12500, . . . , for example. In this condition, route marks may not be affixed to links whose lengths are shorter than the reference link lengths. Further, each reference length may be changed according to an increase or decrease in the quantity of map information as well as the map scale.

The route marks are not to be affixed to the links whose apparent lengths are short. However, when no route mark is applied to a link that appears immediately after the user has turned an intersecting point (when no route mark is displayed because the link appearing immediately after the user has turned the intersecting point, is short), it is hard for the user to understand which intersecting point the user should turn on the display screen of the CRT display 4. Thus, when a guidance route passes through the intersecting point, the guidance route drawing controller 17 makes a decision as to whether the guidance route passing through the intersecting point extends along the road or is off of the road (e.g., turns the intersecting point to the right or turns it to the left). When it is judged that the guidance route is other than along the road, a route mark may be affixed to the link which appears immediately after the user has turned the intersecting point, even if the link is short in length. Further, when the guidance route passes through the intersecting point, a route mark may be applied to the link appearing immediately after passage of the intersecting point regardless of each apparent link length.

[Sixth embodiment]

Figure 19:
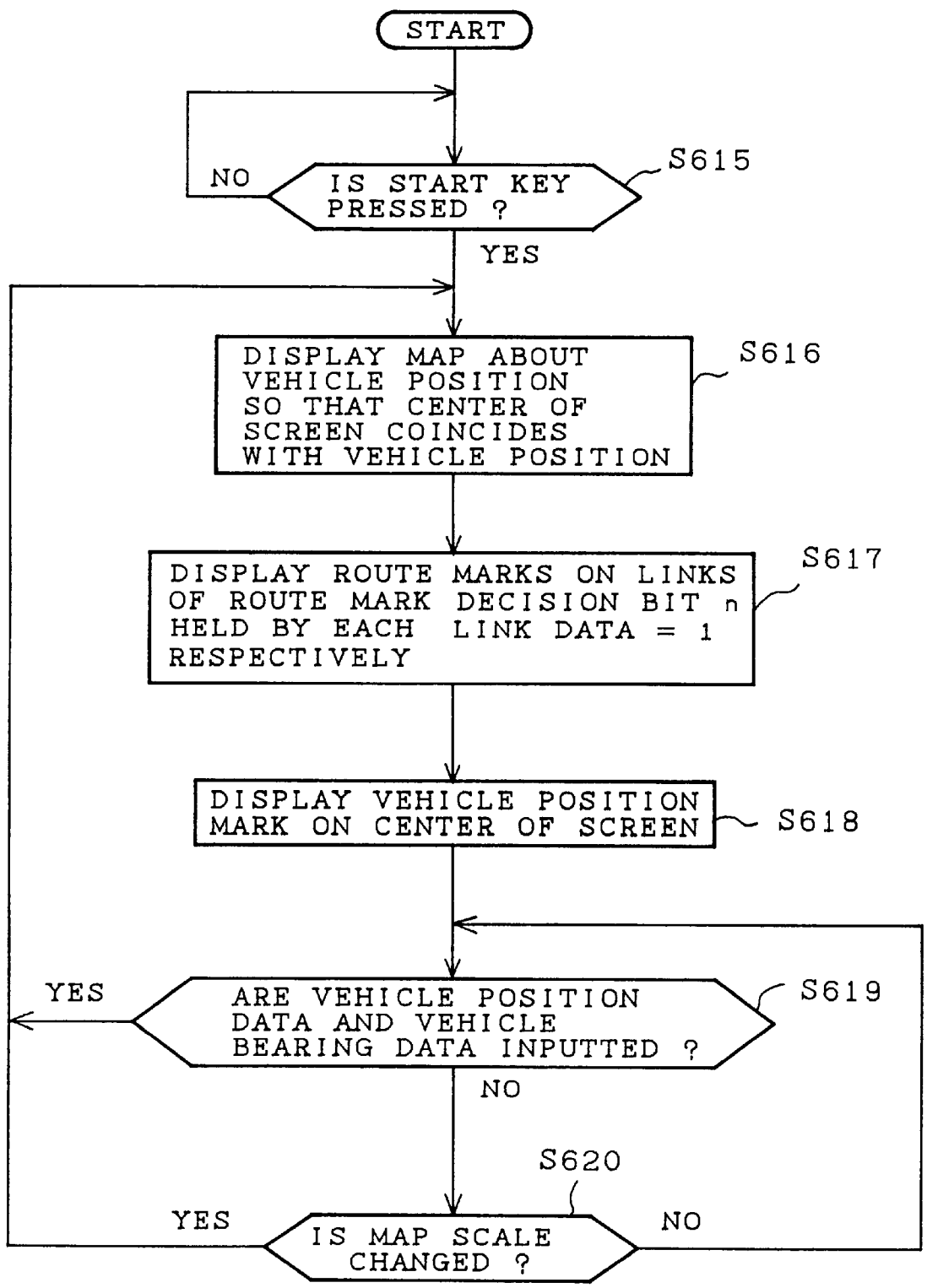
FIG. 19 is a flowchart for describing a map display operation executed in a sixth embodiment of the present invention.
Figure 20:
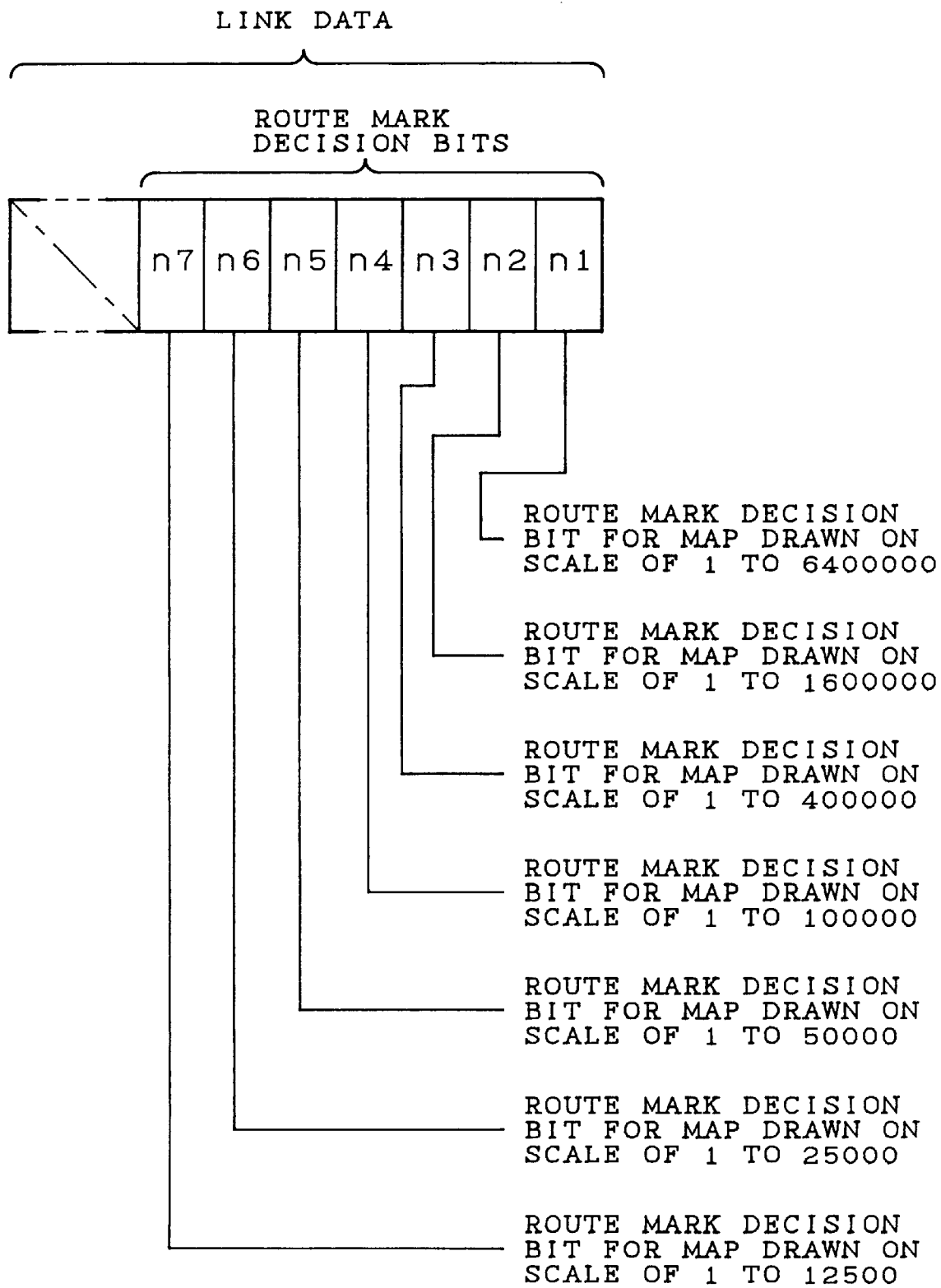
FIG. 20 is a view typically showing link data employed in the sixth embodiment.

A sixth embodiment of the present invention will now be described. FIG. 19 is a flowchart for describing a map display operation executed in the sixth embodiment. FIG. 20 is a view for describing link data.

A navigation system showing the sixth embodiment is identical in structure to that showing the first embodiment except that a guidance route drawing controller is different in specific configuration from that employed in the first embodiment.

The operation of the sixth embodiment will now be described briefly. A user operates an operation panel 2 to set a departure spot and a destination. The navigation system performs route searching to search a route to be recommended between the departure spot and the destination. Upon displaying a map, route marks are not applied to short links but are affixed only to links each having a certain measure of length in a manner similar to the fifth embodiment. The above route mark affixing process is executed without drawing a distinction between a detailed map and a wide-area map where maps drawn on all scales are displayed.

In the present embodiment, route mark decision bits n are affixed to all the link data stored in the CD-ROM 1 every scales. As shown in FIG. 20, each route mark decision bit has a length of one byte. Bits n1 through bits n7 bits correspond to route mark decision bits indicative of maps drawn on scales of 1 to 6400000 through 1 to 12500. A route mark decision bit of "0" is affixed to link data about each link whose length is less than L. A route mark decision bit of "1" is set to link data about each link whose length is more than or equal to L. When the route mark decision bit n=0, no route mark is displayed. On the other hand, when the route mark decision bit n=1, a route mark is displayed.

FIG. 19 is a flowchart for describing a basic operation of a navigation controller 10. The operation of the present embodiment will be described below with reference to FIGS. 19 and 5. In a manner similar to the first embodiment, a departure spot and a destination are set and a guidance route is searched. Information about the searched guidance route is stored in a guidance route memory 16 (S101 through S114 in FIG. 5). Next, when a user presses a start key on an operation panel 2, a map drawing controller 13 receives vehicle position data from a vehicle position detecting unit 3. Further, the map drawing controller 13 reads map data regarding the periphery of coordinates of a vehicle position into a buffer memory 11 from a CD-ROM 1. Furthermore, the map drawing controller 13 draws a map image on a V-RAM 18 so that the center of the screen coincides with the present position of a vehicle (S615, S616 in FIG. 19).

Subsequently, a guidance route drawing controller 17 reads route mark decision bits n for respective links forming a route to be recommended and draws one route mark having directivity to the destination at an intermediate point of each link of n=1 in the V-RAM 18 (S617).

Next, the map drawing controller 13 receives vehicle bearing data from the vehicle position detecting unit 3 and draws a vehicle position mark extending in the direction of indicating the vehicle bearing data on the center of the map drawn in the V-RAM 18 (S618).

A video converter 19 converts the image drawn in the V-RAM 18 to a predetermined video signal and outputs it to a CRT display 4. As a result, the CRT display 4 displays a map image about the vehicle together with the route marks and the vehicle position mark placed in the center of the map. The displayed image is represented as shown in FIG. 17, for example.

When no route marks are successively graphically-affixed to short links (e.g., links of route mark decision bit n=0) on the display screen of the CRT display 4, the guidance route drawing controller 17 draws, on alternate ones in the V-RAM 18, route marks on short links to which the route marks are not originally affixed.

Now, when the vehicle starts to run (S619) or the user operates a map scale changeover key on the operation panel 2 to change a map scale (S620), the map drawing controller 13 reads map data about the periphery of the vehicle position into the buffer memory 11 from the CD-ROM 1. Further, the map drawing controller 13 draws a map image in the V-RAM 18 so that the vehicle position coincides with the center of the map (S616). Next, the guidance route drawing controller 17 reads nodes included in a map drawing area of the V-RAM 18 and lying around the vehicle position from the guidance route memory 16 as data. Further, the guidance route drawing controller 17 reads route mark decision bits n for respective links and displays a route mark at an intermediate point of each link of n=1 (S617). The map image at the periphery of the vehicle position, the route marks and the vehicle position mark are repeatedly drawn below in the same manner as described above each time the vehicle is driven by a predetermined distance or the map scale is changed.

In the present embodiment, the one route mark is affixed to each link. However, two or more route marks may be affixed to a single link.

Further, a single link is formed by two nodes, for example. However, interpolation points for representing a curve of a road exist between normal nodes as shown in FIG. 12. Route marks are displayed one by one at an intermediate point of a segment between the node and the interpolation point and an intermediate point of a segment between the adjacent interpolation points without affixing the route marks to their corresponding links. Further, route mark decision bits n corresponding to a plurality of segments forming respective links are respectively stored in the CD-ROM 1. In this condition, a route mark may be affixed to each segment of n=1 of the plurality of segments.

In the sixth embodiment, no route marks are applied to the links indicative of n (route mark decision bit)=0. However, where no route mark is affixed to a link that appears immediately after the user has turned an intersecting point (when the route mark decision bit n of the link that appears immediately after the user has turned the intersecting point, is 0 (n=0)), it is hard for the user to understand which intersecting point the user should turn as far as the user sees the display screen of the CRT display 4. Therefore, the guidance route drawing controller 17 may draw route marks unconditionally in the V-RAM 18 when the guidance route passes through the intersection point. Further, the guidance route drawing controller 17 makes a decision as to whether the guidance route passing through the intersecting point extends along the road or is off of the road (e.g., turns the intersecting point to the right or turns it to the left). When it is judged that the guidance route is other than along the road, route marks may be drawn in the V-RAM 18.

In the third through sixth embodiments, where a single link is too long to display route marks on the display screen of the CRT display 4 when the detailed map is displayed, the guidance route drawing controller 17 may draw two route marks in total so as to correspond to a route mark display position (corresponding to an intermediate point of each link) out of the screen and an intermediate point between nodes on both sides of the route mark display position.

Figure 21:
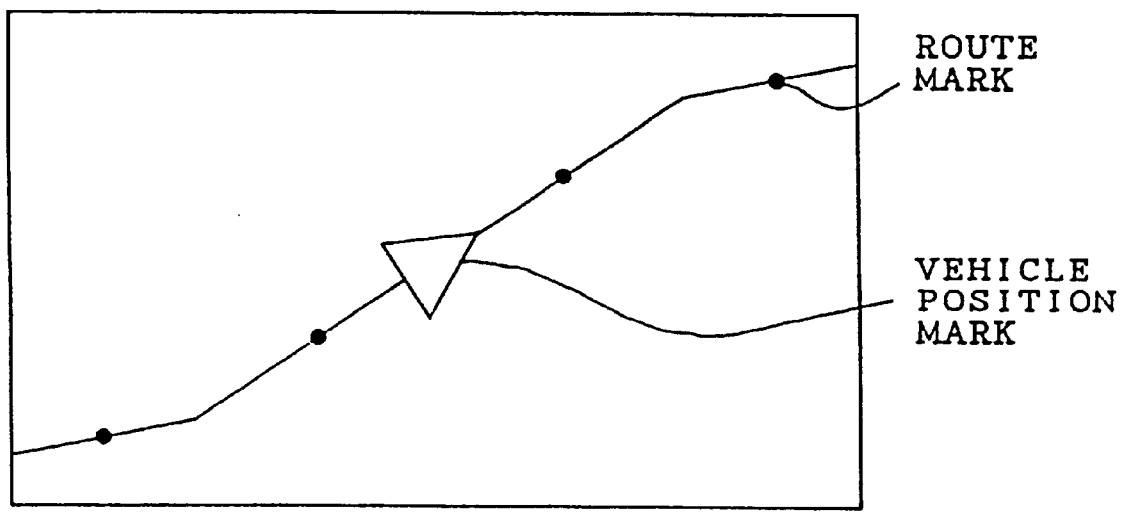
FIG. 21 is a view for describing a display screen employed in the present invention.

In the first through sixth embodiments, each route mark is shaped in the form of a triangle having directivity. However, the route mark does not necessarily require to have directivity. Alternatively, round route marks may be used as shown in FIG. 21, for example.

[Seventh embodiment]

Figure 22:
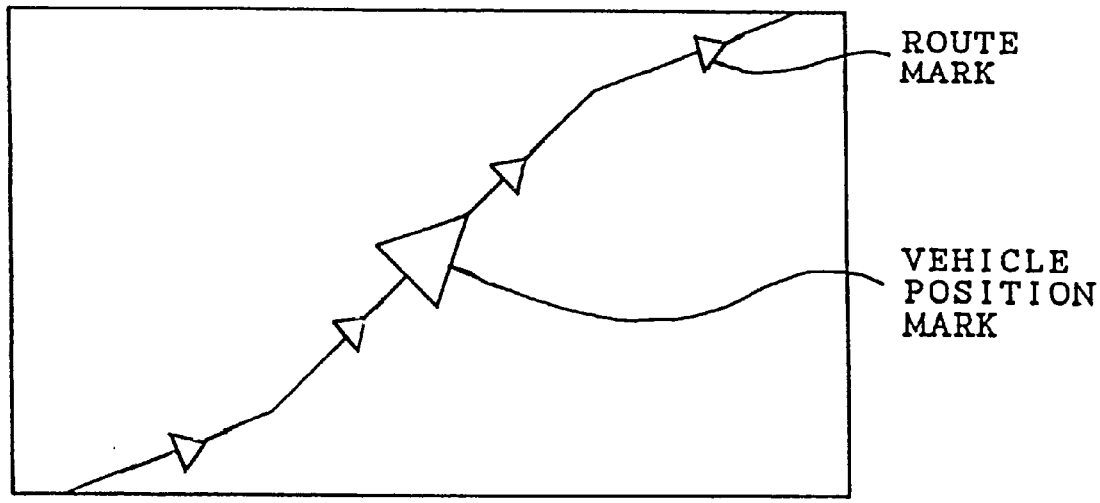
FIG. 22 is a view for describing a screen on which a detailed map employed in a seventh embodiment of the present invention is displayed.
Figure 23:
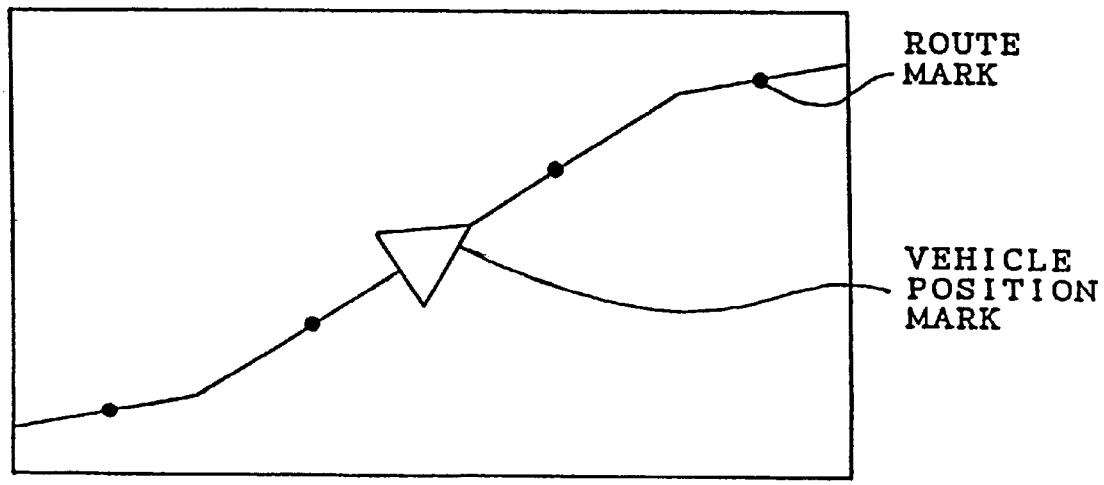
FIG. 23 is a view for describing a screen on which a wide-area map employed in the seventh embodiment is displayed.
Figure 24:
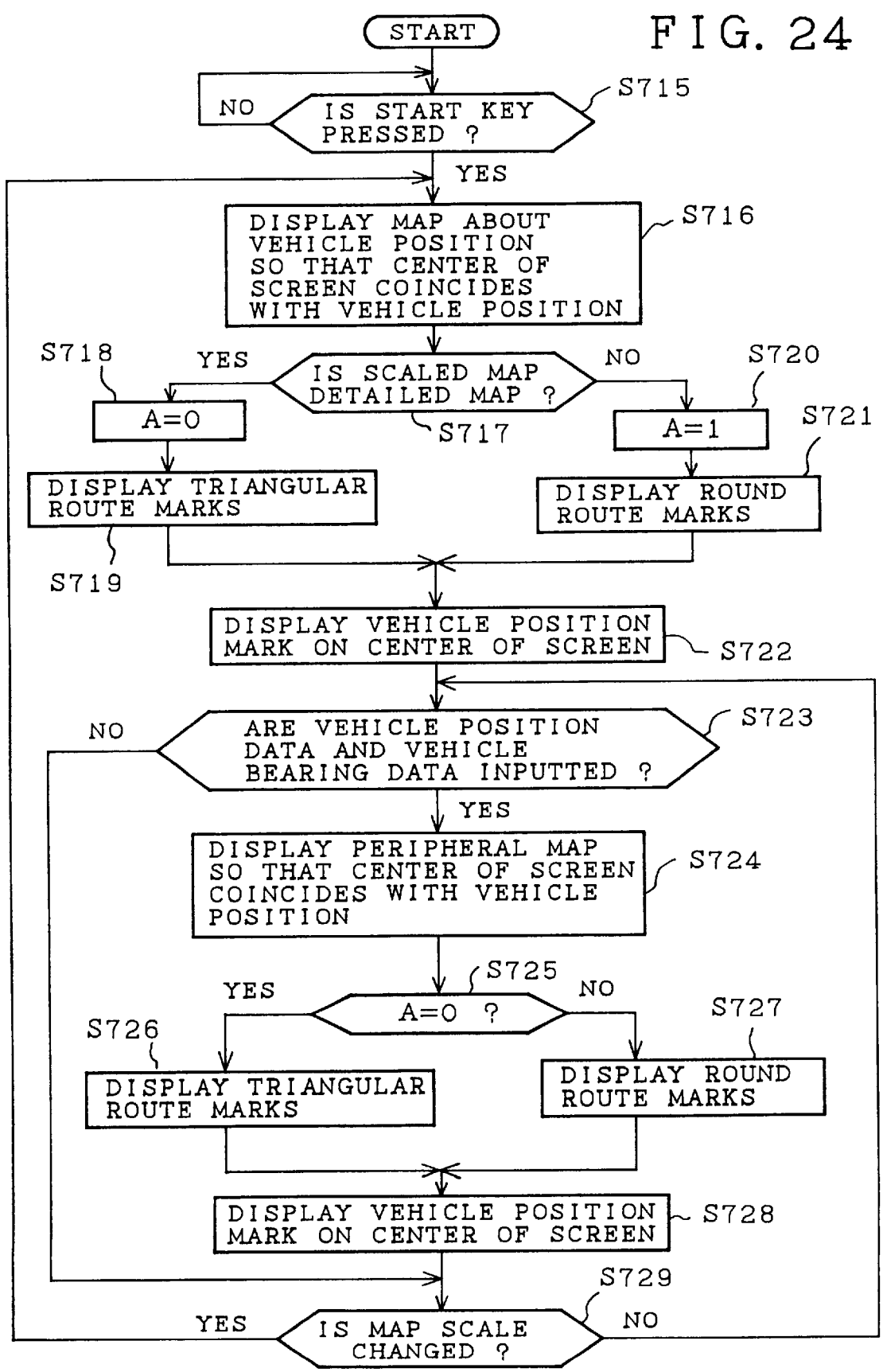
FIG. 24 is a flowchart for explaining a map display operation executed in the seventh embodiment.

A seventh embodiment of the present invention will now be described. FIG. 22 is a view for describing a screen on which a detailed map is displayed. FIG. 23 is a view for describing a screen on which a wide-area map is displayed. FIG. 24 is a flowchart for describing a screen display operation. A navigation system showing the seventh embodiment is identical in structure to that showing the first embodiment except that a guidance route drawing controller is different in specific configuration from that employed in the first embodiment.

The operation of the seventh embodiment will now be described briefly. A user operates an operation panel 2 to set a departure spot and a destination. The navigation system performs route searching to search a route to be recommended between the departure spot and the destination. When the detailed map is displayed upon displaying a map, triangular route marks each having directivity to the destination are displayed as shown in FIG. 22. When the wide-area map is displayed, round route marks having no directivity are displayed as shown in FIG. 23.

In the first embodiment, the large route marks are displayed in the case of the detailed map and the small route marks are displayed in the case of the wide-area map. At this time, the triangular route marks identical to each other were displayed in the detailed map and the wide-area map. In the present embodiment, however, the route marks are different in shape from each other between the detailed map and the wide-area map.

The number of dots arranged in horizontal and vertical directions on a display screen of a standard CRT display 4 installed on a vehicle, is about 328×242. Thus, in the first embodiment, the 32 bearings are prepared as the orientations of the route marks as described using FIG. 7. However, the more the number of bearings increases and the size of each route mark decreases, the more the creation of shape of each route mark is rendered difficult. This causes a state that route marks are hard to be distinguishable from others.

Thus, in the present embodiment, large triangular route marks are displayed in the case of a detailed map and small round route marks in which the number of dots may be reduced, are displayed in the case of a wide-area map. As a result, the shape of each route mark can be easily created and visibility of each route mark on the display screen of the CRT display 4 is increased.

The operation of the present embodiment will be described below with reference to FIGS. 24 and 5. In a manner similar to the first embodiment, a departure spot and a destination are set and a guidance route is searched. Information about the searched guidance route is stored in a guidance route memory 16 (S101 through S114 in FIG. 5). When the user presses a start key on the operation panel 2, a map drawing controller 13 receives vehicle position data from a vehicle position detecting unit 3. Further, the map drawing controller 13 reads map data regarding the periphery of coordinates of a vehicle position into a buffer memory 11 from a CD-ROM 1. Furthermore, the map drawing controller 13 draws a map image on a V-RAM 18 so that the center of a map coincides with the present position of a vehicle (S715, S716 in FIG. 24).

Subsequently, a guidance route drawing controller 17 judges whether a displayed map corresponds to either the detailed map or the wide-area map (S717). The guidance route drawing controller 17 sets a map scale selection bit A based on the result of this decision. If the detailed map is displayed, then A is set to 0 (A=0). Further, the guidance route drawing controller 17 draws a triangular route mark having directivity to the destination at an intermediate point of each of the links forming a route to be recommended in the V-RAM 18 so that the triangular route mark is displayed on the screen (S718, S719). If the wide-area map is displayed, then A is set to 1 (A=1). Further, a round route mark is drawn at an intermediate point of each link forming the route to be recommended in the V-RAM 18 so that the round route mark is displayed (S720, S721).

The map drawing controller 13 receives vehicle bearing data from the vehicle position detecting unit 3 and draws a vehicle position mark on the center of the map drawn in the V-RAM 18 in the direction of indicating the vehicle bearing data (S722).

A video converter 19 converts the image drawn in the V-RAM 18 to a predetermined video signal and outputs it to the CRT display 4. As a result, the CRT display 4 displays a map image about the periphery of the vehicle together with the route marks and the vehicle position mark placed in the center of the screen thereof.

When the vehicle starts to run, the vehicle position detecting unit 3 detects a vehicle position and a vehicle bearing each time the vehicle is driven by a predetermined distance. Further, the vehicle position detecting unit 3 outputs data about the vehicle position and bearing to the map drawing controller 13 and also outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1. Further, the map drawing controller 13 draws a map image in the V-RAM 18 so that the center of the map coincides with the vehicle position (S723, S724). Subsequently, the guidance route drawing controller 17 judges the value of the bit A (S725). If A=0, then the guidance route drawing controller 17 reads nodes included in a map drawing area of the V-RAM 18 and lying around the vehicle position from the guidance route memory 16 as data. Further, the guidance route drawing controller 17 draws each of the triangular route marks at an intermediate point of each link so that each triangular route mark be superposed on the map image drawn in the V-RAM 18 (S726). If A≠0, then the guidance route drawing controller 17 displays round route marks at the intermediate points of the respective links one by one (S727).

Next, the map drawing controller 13 draws a vehicle position mark extending in the direction of indicating the vehicle bearing data on the center of the map drawn in the V-RAM 18, based on the vehicle bearing data (S728). At this time, the map image on the screen is scrolled by a predetermined distance in a state in which the vehicle position has been held in the center of the screen. When the user operates a map scale changeover key on the operation panel 2 to change the scale (S729), the routine procedure is returned to S716, followed by re-execution of drawing of the map, setting of the bit A, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed by the user.

[Eighth embodiment]

Figure 25:
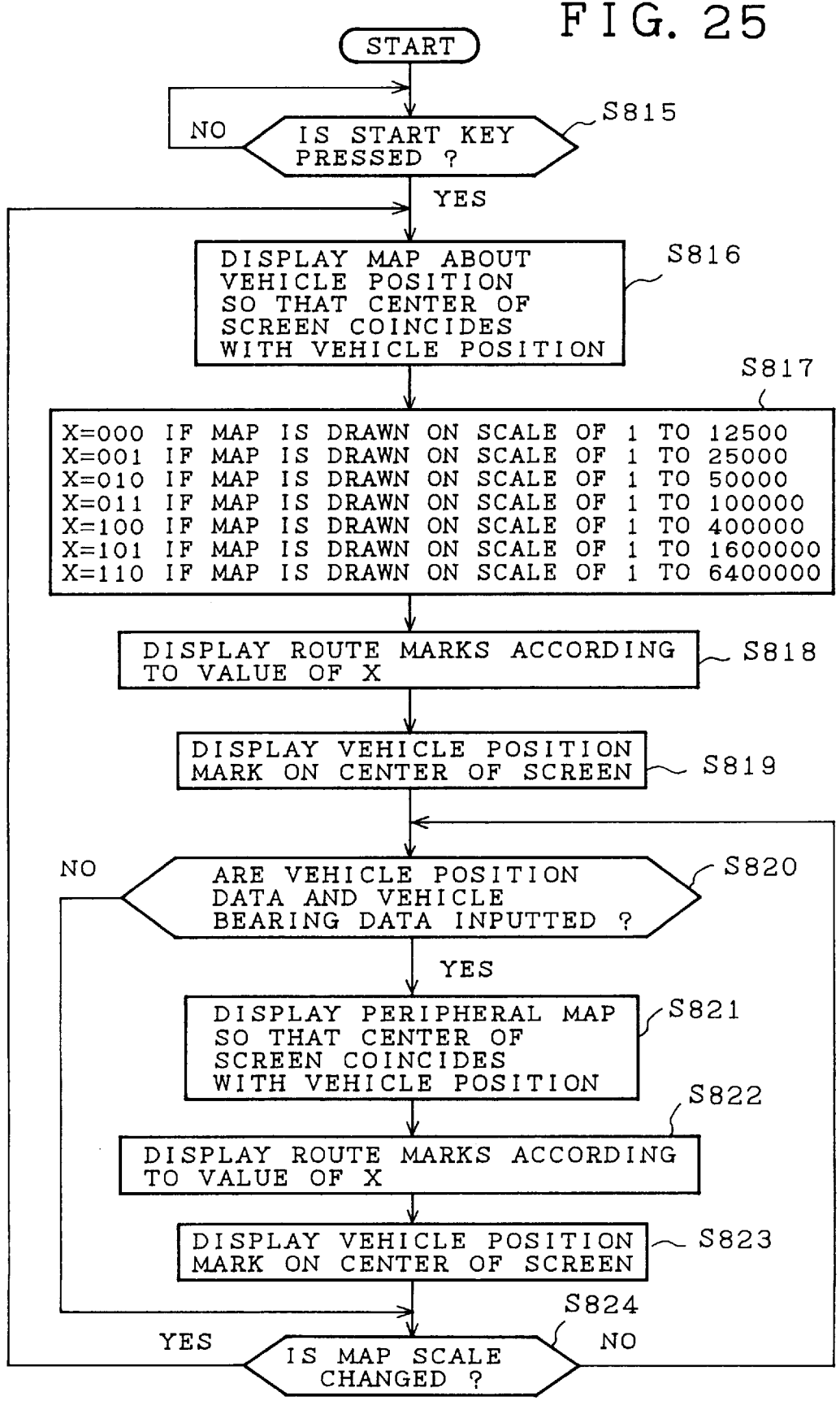
FIG. 25 is a flowchart for describing a map display operation executed in an eighth embodiment of the present invention.

An eighth embodiment of the present invention will now be described. FIG. 25 is a flowchart for describing a map display operation. A navigation system showing the eighth embodiment is identical in structure to that showing the first embodiment except that a guidance route drawing controller is different in specific configuration from that employed in the first embodiment.

The operation of the eighth embodiment will now be described briefly. A user operates an operation panel 2 to set a departure spot and a destination. The navigation system performs route searching to search a route to be recommended between the departure spot and the destination. Upon displaying a map, route marks different in size and shape from each other are displayed according to map scales. Namely, in order to improve visibility of route marks on a display screen of a CRT display 4 in a manner similar to the aforementioned embodiments, route marks different in size and shape (i.e., which are divided into seven stages different from each other) are displayed according to maps drawn on seven-stage scales of 1 to 12500 through 1 to 6400000.

The guidance route drawing controller 17 stores data about the route marks for the respective scales therein and use these data properly according to the scale of a map to be displayed.

The route marks corresponding to the respective map scales are as follows:

Map drawn on a scale of 1 to 12500 . . . Route mark A
route marks represented in the form of 32 orientations or bearings.

Map drawn on a scale of 1 to 25000 . . . Route mark B route marks represented in 32 bearings, each of which is slightly smaller than the route mark A.

Map drawn on a scale of 1 to 50000 . . . Route mark C route marks represented in the form of 16 bearings.

Map drawn on a scale of 1 to 100000 . . . Route mark D route marks represented in the form of 16 bearings, each of which is slightly smaller than the route mark C.

Map drawn on a scale of 1 to 400000 . . . Route mark E route marks represented in the form of 8 bearings.

Map drawn on a scale of 1 to 1600000 . . . Route mark F route marks represented in the form of 8 bearings, each of which is slightly smaller than the route mark E.

Map drawn on a scale of 1 to 6400000 . . . Route mark G round route marks each having no orientation.

The sizes of the respective route marks gradually decrease in following order of the route mark A to the route mark G:

Route mark A>Route mark B>Route mark C>Route mark D>Route mark E>Route mark F>Route mark G The more the number of bearings for the route marks increases, i.e., the route marks are prepared in a multidirection and the size of each route mark is reduced, the more the shape or configuration of each route mark is hard to make out. Further, the shape of each route mark becomes distorted. Therefore, the number of bearings or orientations for the route marks is reduced as a map to be displayed becomes a wide-area map and each route mark is reduced in size. It is thus possible to easily create the shape of each route mark and improve visibility of each route mark.

By displaying such route marks, the route marks are reduced in size on the screen as the map becomes the wide-area map. Thus, the realism of expanding the map is visualized by a user who casts his/her eyes on the map. The user can sensitively judge whether a map to be displayed is either a detailed map or a wide-area map.

The operation of the present embodiment will be described below with reference to FIGS. 25 and 5. In a manner similar to the first embodiment, a departure spot and a destination are set and a guidance route is searched. Information about the searched guidance route is stored in a guidance route memory 16 (S101 through S114 in FIG. 5). When the user presses a start key on the operation panel 2, a map drawing controller 13 receives vehicle position data from a vehicle position detecting unit 3. Further, the map drawing controller 13 reads map data regarding the periphery of coordinates of a vehicle position into a buffer memory 11 from a CD-ROM 1. Furthermore, the map drawing controller 13 draws a map image on a V-RAM 18 so that the center of the screen coincides with the present position of a vehicle (S815, S816 in FIG. 25).

The guidance route drawing controller 17 sets a map scale selection bit X to a value corresponding to a scale of a map to be displayed. Maps drawn on scales of 1 to 12500 through 1 to 6400000 respectively correspond to X=000–110 (S817). Route marks corresponding to the set values of X are as follows:

X=000: Route mark A
X=001: Route mark B
X=010: Route mark C
X=011: Route mark D
X=100: Route mark E
X=101: Route mark F
X=110: Route mark G The guidance route drawing controller 17 draws in the V-RAM 18, one by one, the route marks corresponding to the set values of X at intermediate points of respective links forming a route to be recommended (S818).

The map drawing controller 13 receives vehicle bearing data from the vehicle position detecting unit 3 and draws a vehicle position mark extending in the direction of indicating the vehicle bearing data on the center of the map drawn in the V-RAM 18 (S819).

A video converter 19 converts the image drawn in the V-RAM 18 to a predetermined video signal and outputs it to the CRT display 4. As a result, the CRT display 4 displays a map image about the periphery of the vehicle together with the route marks and the vehicle position mark placed in the center of the displayed map.

When a single link is too long to display route marks on the display screen of the CRT display 4, the guidance route drawing controller 17 may draw two route marks in total in the V-RAM 18 at the positions between the original route mark display position (corresponding to an intermediate point of each link) out of the screen and nodes on both sides of the original route mark display position.

When the vehicle starts to move, the vehicle position detecting unit 3 detects a vehicle position and a vehicle orientation or bearing each time the vehicle is driven by a predetermined distance. Further, the vehicle position detecting unit 3 outputs data about the vehicle position and bearing to the map drawing controller 13 and also outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1 and draws a map image in the V-RAM 18 so that the center of the map coincides with the vehicle position (S820, S821).

Subsequently, the guidance route drawing controller 17 reads nodes included in a map drawing area of the V-RAM 18 and lying around the vehicle position from the guidance route memory 16 as data. The guidance route drawing controller 17 judges the value of X and draws a route mark corresponding to the value of X at an intermediate point of each link so that the route mark be superposed on the map image drawn in the V-RAM 18 (S822). Next, the map drawing controller 13 draws a vehicle position mark extending in the direction of indicating the vehicle bearing data on the center of the map drawn in the V-RAM 18, based on the vehicle bearing data (S823). At this time, the map image on the screen is scrolled by a predetermined distance in a state in which the vehicle position has been held in the center of the screen.

When the user operates a map scale changeover key on the operation panel 2 to change the scale (S824), the routine procedure is returned to S816, followed by re-execution of drawing of the map, setting of the bit X, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed by the user.

[Ninth embodiment]

Figure 26:
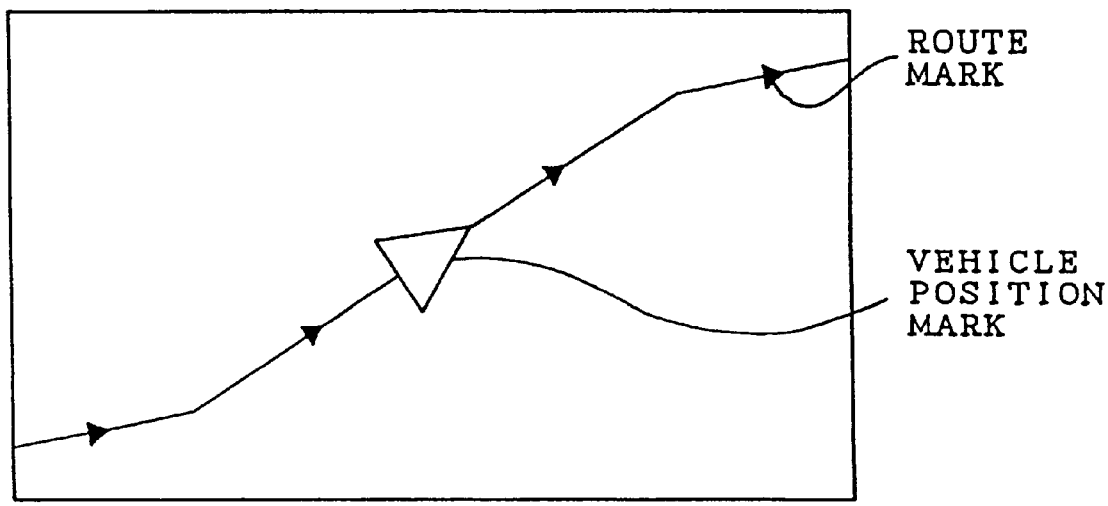
FIG. 26 is a view for describing a screen on which a detailed map employed in a ninth embodiment of the present invention is displayed.
Figure 27:
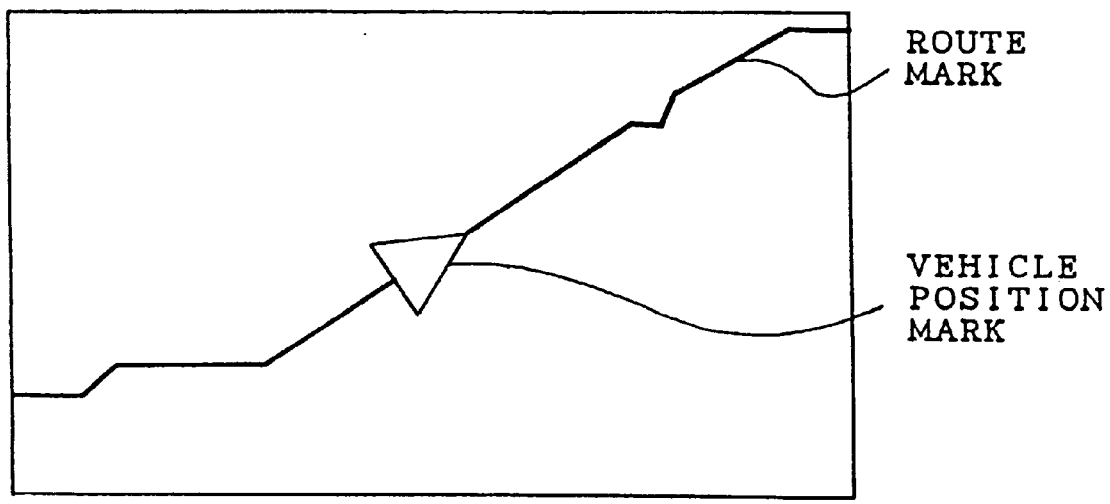
FIG. 27 is a view for describing a screen on which a wide-area map employed in the ninth embodiment is displayed.
Figure 28:
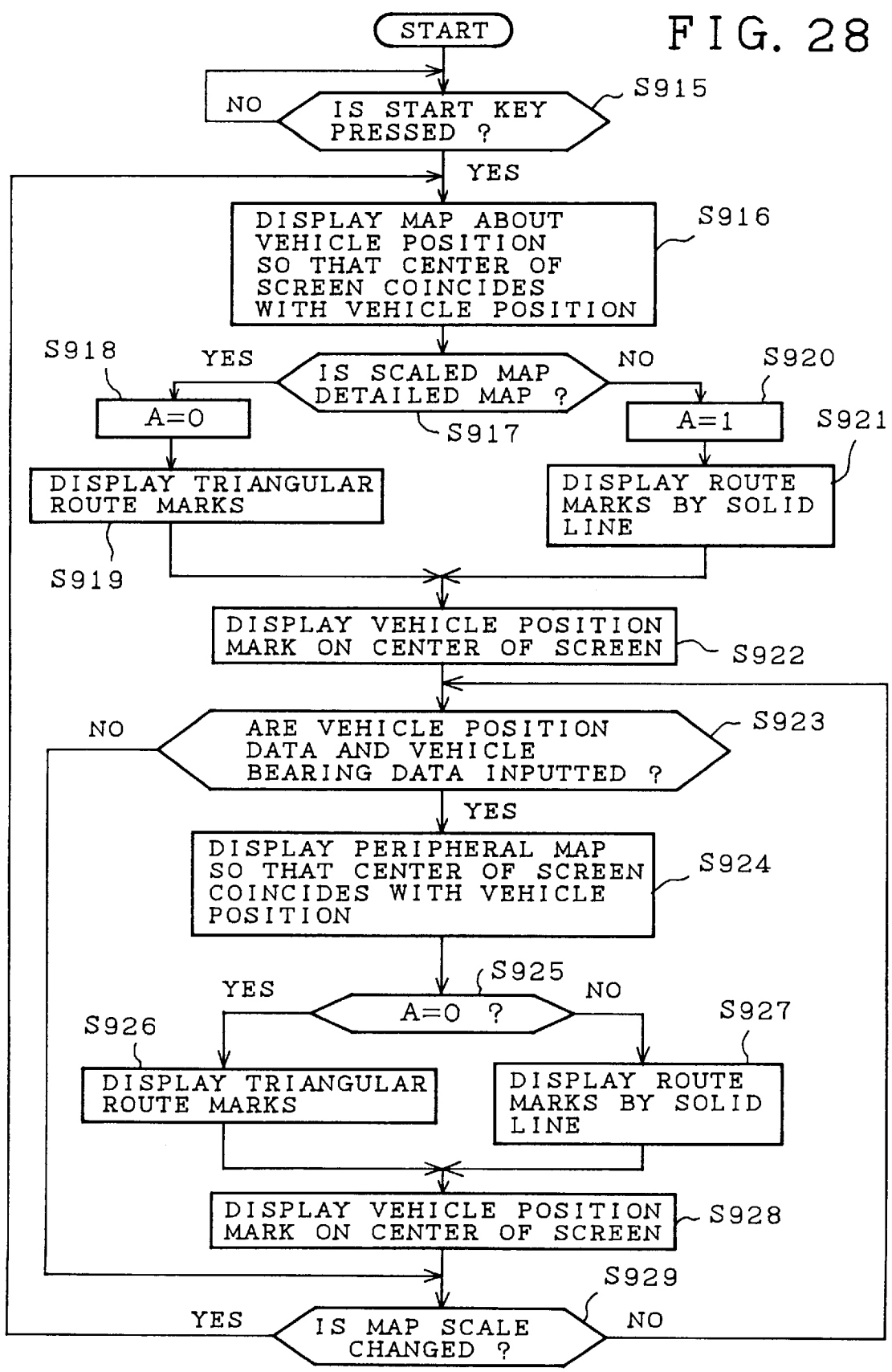
FIG. 28 is a flowchart for describing a map display operation executed in the ninth embodiment.

A ninth embodiment of the present invention will now be described. FIG. 26 is a view for describing a screen on which a detailed map employed in the ninth embodiment is displayed. FIG. 27 is a view for describing a screen on which a wide-area map is displayed. FIG. 28 is a flowchart for describing a map display operation. A navigation system showing the ninth embodiment is identical in structure to that showing the first embodiment except that a guidance route drawing controller is different in specific configuration from that employed in the first embodiment.

The operation of the ninth embodiment will now be described briefly. A user operates an operation panel 2 to set a departure spot and a destination. The navigation system performs route searching to search a route to be recommended between the departure spot and the destination. When the detailed map is displayed upon displaying a map, triangular route marks each having directivity to the destination are displayed as shown in FIG. 26. When the wide-area map is displayed, solid-line routes are displayed as shown in FIG. 27.

The operation of the present embodiment will be described below with reference to FIGS. 28 and 5. Similarly to the first embodiment, a departure spot and a destination are set and a guidance route is searched. Further, information about the searched guidance route is stored in a guidance route memory 16 (S101 through S114 in FIG. 5). When the user presses a start key on the operation panel 2, a map drawing controller 13 receives vehicle position data from a vehicle position detecting unit 3 and reads map data regarding the periphery of coordinates of a vehicle position into a buffer memory 11 from a CD-ROM 1. Further, the map drawing controller 13 draws a map image on a V-RAM 18 so that the center of the map coincides with the present position of a vehicle (S915, S916 in FIG. 28).

A guidance route drawing controller 17 judges whether a displayed map corresponds to either the detailed map or the wide-area map (S917). The guidance route drawing controller 17 sets a map scale selection bit X according to the scale of the displayed map. If the detailed map is displayed, then the guidance route drawing controller 17 sets A to 0 (A=0) and draws in the V-RAM 18, one by one, triangular route marks each having directivity to the destination at intermediate points of links forming a route to be recommended (S918, S919). If the wide-area map is displayed, then the guidance route drawing controller 17 sets A to 1 (A=1) and draws a route on the links forming the recommended route by a line in the V-RAM 18 (S920, S921).

Next, the map drawing controller 13 receives vehicle bearing data from the vehicle position detecting unit 3 and draws a vehicle position mark extending in the direction of indicating the vehicle bearing data on the center of the map drawn in the V-RAM 18 (S922).

A video converter 19 converts the image drawn in the V-RAM 18 to a predetermined video signal and outputs it to a CRT display 4. As a result, the CRT display 4 displays a map image about the periphery of the vehicle together with the route marks and the vehicle position mark placed in the center of the screen thereof. The triangular route marks each having directivity to the destination are displayed in the detailed map as shown in FIG. 26. In the case of the wide-area map, the route is displayed by the solid line as shown in FIG. 27.

When a single link is too long to display route marks on the display screen of the CRT display 4, the guidance route drawing controller 17 draws two route marks in the V-RAM 18 at the positions between the original route mark display position (corresponding to an intermediate point of each link) out of the screen and nodes on both sides of the original route mark display position.

When the vehicle starts to run, the vehicle position detecting unit 3 detects a vehicle position and a vehicle orientation or bearing each time the vehicle is driven by a predetermined distance. Further, the vehicle position detecting unit 3 outputs data about the vehicle position and bearing to the map drawing controller 13 and also outputs the vehicle position data to the guidance route drawing controller 17. When the vehicle position data and the vehicle bearing data are inputted to the map drawing controller 13 from the vehicle position detecting unit 3, the map drawing controller 13 reads map data about the periphery of the vehicle position into the buffer memory 11 from the CD-ROM 1 and draws a map image in the V-RAM 18 so that the center of the map coincides with the vehicle position (S923, S924).

Subsequently, the guidance route drawing controller 17 judges the value of a bit A (S925). If A=0, then the guidance route drawing controller 17 reads nodes included in a map drawing area of the V-RAM 18 and lying around the vehicle position from the guidance route memory 16 as data. The guidance route drawing controller 17 draws a triangular route mark at an intermediate point of each link in the V-RAM 18 so that the triangular route mark be superposed on the map image drawn in the V-RAM 18 (S926). If A≠0, then the guidance route drawing controller 17 draws a route by a line in the V-RAM 18 so that the route is superposed on each link (S927). Next, the map drawing controller 13 draws a vehicle position mark extending in the direction of indicating the vehicle bearing data on the center of the map drawn in the V-RAM 18, based on the vehicle bearing data (S928). At this time, the map image on the screen is scrolled by a predetermined distance in a state in which the vehicle position has been held in the center of the screen. When the user operates a map scale changeover key on the operation panel 2 to change the scale (S929), the routine procedure is returned to S916, followed by re-execution of drawing of the map, setting of the bit A, drawing of the route marks and drawing of the vehicle position mark.

The map image at the periphery of the vehicle position, the route marks and the vehicle position mark are repeatedly drawn below in the same manner as described above each time the vehicle is driven by the predetermined distance or the map scale is changed by the user.

Figure 29:
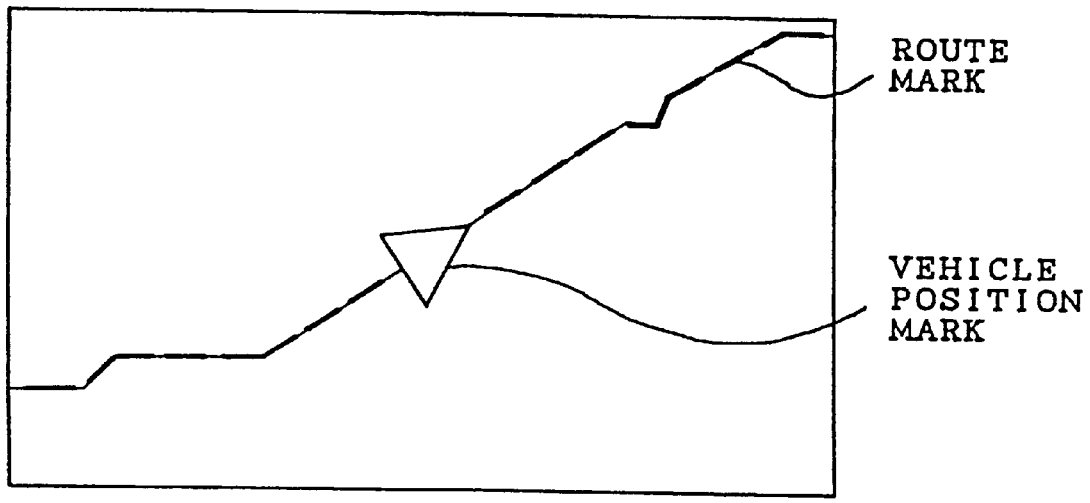
FIG. 29 is a view for explaining a display screen employed in the present invention.

Although the route in the wide-area map is displayed by the solid line, a dotted line may be used as an alternative as shown in FIG. 29. Further, an alternate long and short dash line, a broken line or the like may be used.

In the mobile navigation system according to the present embodiment, as described above, the route marks are displayed in the case of the detailed map and the route is displayed by the solid line in the case of the wide-area map. As a result, software processing can be simplified. It is also easy to recognize the route even in the case of any scale. Further, since it is unnecessary to provide two kinds of route mark data, the capacity necessary for the data can be reduced.

The aforementioned embodiments have described the method of displaying the recommended route between the departure spot and the destination. However, the respective embodiments can be applied to other route displays such as a display of a route from a departure spot to a via spot, etc. Further, the aforementioned embodiments may be utilized when traffic information such as a traffic snarl, construction, etc. sent from a traffic information center or the like is displayed using a semi-microwave system, an inductive radio system or an FM multiplex system or the like.

The aforementioned embodiments have already described the case where when the single link is too long to display the route marks on the display screen of the CRT display 4, a total of two route marks may be displayed one by one at the route mark display position (intermediate point of each link) out of the screen and the intermediate point between the nodes on both sides of the route mark display position. This processing can prevent the user from being embarrassed. At this time, the navigation system can judge based on coordinates of a route mark and a displayed map area whether the route mark is displayed on a display screen.

Further, when no route mark is displayed within a predetermined range (e.g., central portion) of a display screen, the number of route marks to be displayed can be increased. In the aforementioned embodiments, the route marks are affixed to the searched guidance route. However, the route marks may be affixed to the pre-stored route to be recommended.

A description has already been made of the case in which the route marks may be affixed to the intermediate point between each node and the interpolation point and the intermediate point between the interpolation points. At this time, however, it might be better if the route marks are oriented toward the next interpolation point.

In the aforementioned embodiments as well, the display of each route mark may be varied according to whether a vehicle is at a stop or running. Where it is desired to display route marks on a narrow road while the vehicle is running when a method of displaying the narrow road when the vehicle is at a stop and stopping its display when the vehicle is running, for example, is being used, the narrow road that is not normally displayed, is displayed and route marks whose shapes or sizes have been changed, may be displayed.

Further, in the aforementioned embodiments, the kind of route mark, the number of route marks and the shape and side of each route mark are changed. However, the color of the route mark may be changed.

Still further, in the aforementioned embodiments, the route marks are displayed at the intermediate points of the respective links. As an alternative, however, route marks may be displayed at two points that divide a link into three equal parts, for example.

Figure 30:
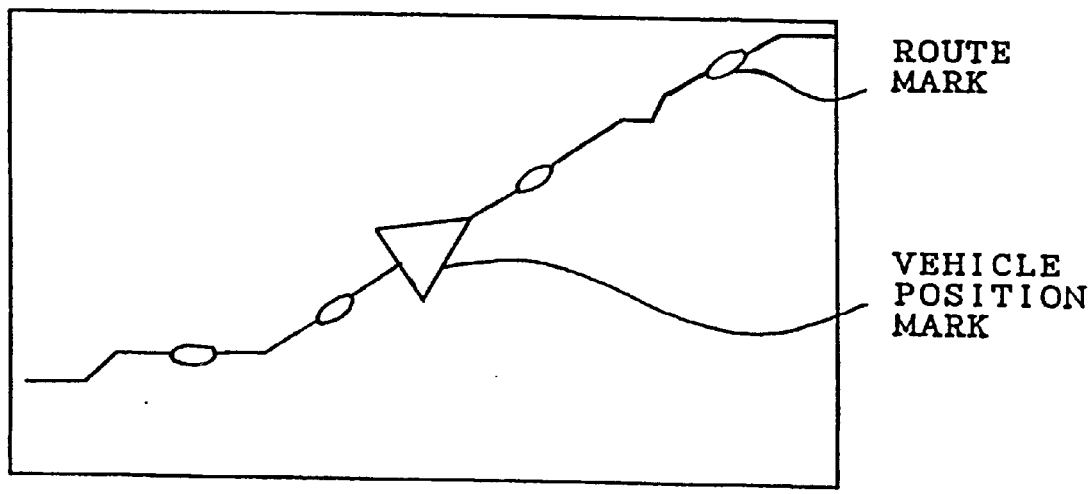
FIG. 30 is a view for describing another display screen employed in the present invention.
Figure 31:
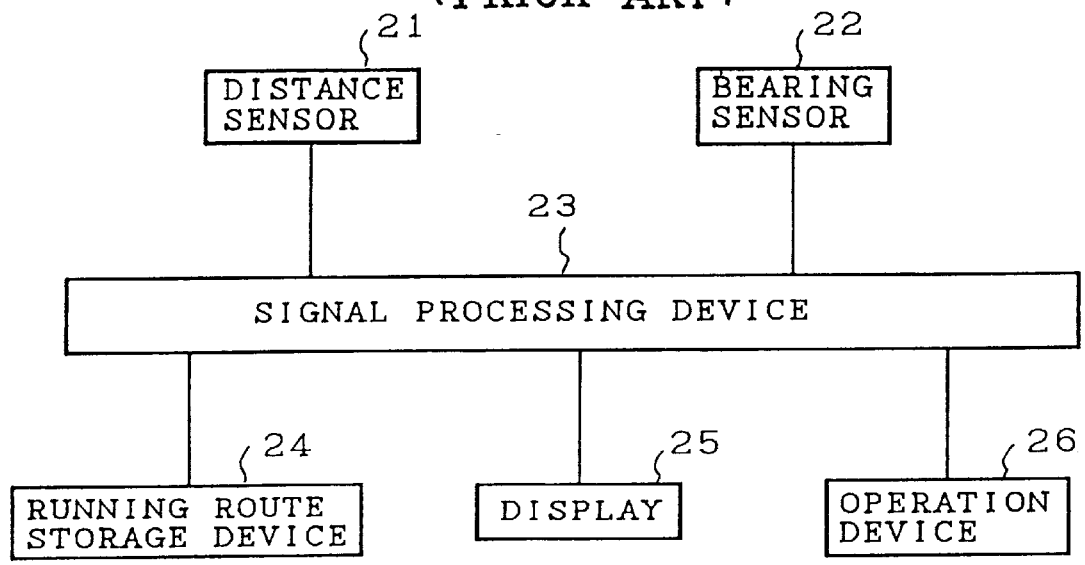
FIG. 31 is a block diagram showing a conventional mobile navigation system.
Figure 32:
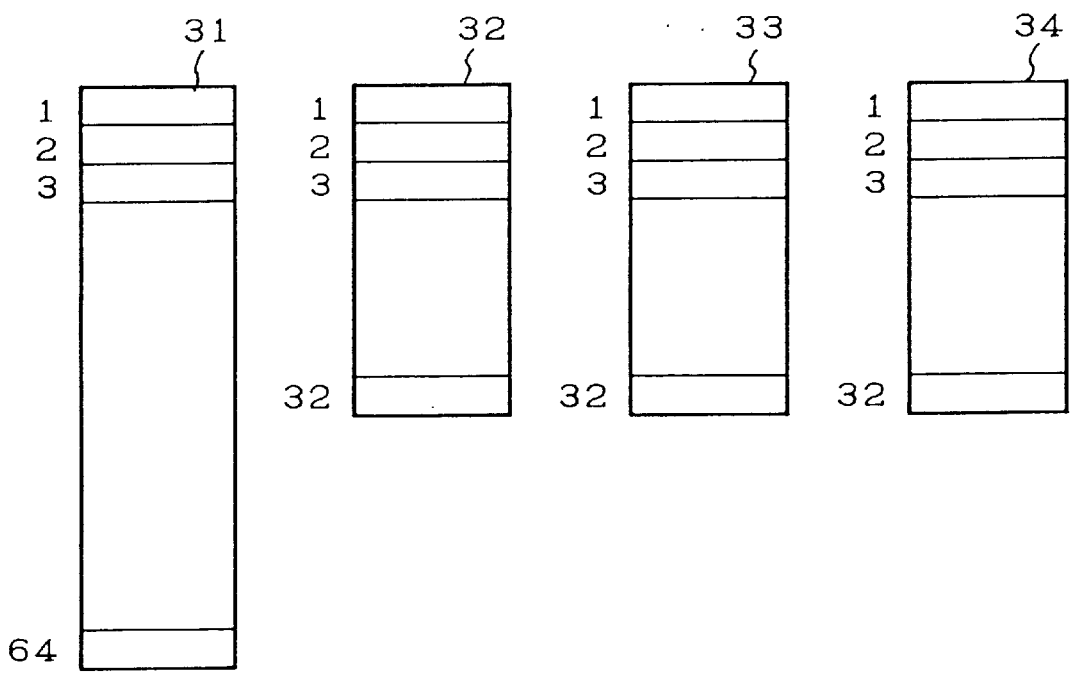
FIG. 32 is a layout view showing conventional locus memory tables.

Still further, in the aforementioned embodiments, other route marks each having directivity, such as elliptical route marks shown in FIG. 30 each having directivity, etc. can also be used as an alternative to the triangular route marks having directivity.

The mobile navigation system according to each of the aforementioned embodiments possesses a feature in that when a route between desired two points is displayed, the routes can be respectively displayed by different methods in the case of a wide-area map and a detailed map. In the mobile navigation system according to each of the embodiment as well, since the route is displayed using the different methods in the case of the wide-area map and the detailed map upon displaying the route between the desired two points, a route having good visibility can be displayed even in the case of any scale.

Further, in the mobile navigation system, since a route is displayed using different methods according to the scale of a map to be displayed, it is easy to recognize the route even on any scale.

Still further, in the mobile navigation system according to each embodiment referred to above, since large route marks are displayed in the case of a detailed map and small route marks are displayed in the case of a wide-area map, it is easy to recognize a route on any scale. It is also easy for a user to judge a difference between the detailed map and the wide-area map.

Still further, in the mobile navigation system, since the routes marks are different in interval from each other in the case of a detailed map and a wide-area map, it is easy to recognize a route on any scale. Further, since it is unnecessary to prepare two kinds of route mark data, the capacity necessary for the data can be reduced.

Still further, in the mobile navigation system according to each of the aforementioned embodiments, since a road with a route displayed thereon is prevented from disappearing in a route display, a user can accurately recognize an attribute and a position of a driving road.

Still further, in the mobile navigation system, since route marks are different in shape from each other in the case of a detailed map and a wide-area map, it is possible to easily recognize a route on any scale and to easily create the shape of each route mark.

According to the mobile navigation system of the present invention, as has been described above, since the route is displayed according to the scale of the map, the user can easily recognize or confirm the route. It is also possible to provide the route marks corresponding to the scale, which can be easily recognized by the user. Further, the route marks can be easily displayed and display processing can be simplified. Furthermore, the interval between the adjacent route marks can be suitably set so that the user can easily confirm them.

What is claimed is:

1. A mobile navigation system comprising:

map data storing means for storing therein respective map data representative of maps corresponding to a plurality of scales;

means for selecting a location on one of said maps and selecting one of said plurality of scales at the selected location;

route storing means for storing therein data representative of a route between two desired points and a plurality of route marks;

map displaying means, responsive to the selected one of said plurality of scales at the selected location, for displaying one of said maps and said route thereon based on said map data and said route data and for displaying a set of said route marks on said map in accordance with said route, based on the selected scale at the selected location; and route calculating means for calculating a guidance route for guiding a vehicle; wherein said map displaying means comprises means for determining a scale selected and for altering the display of said map, route and route marks according to the selected scale at the selected location, and wherein said route calculating means reads data regarding respective links on a guidance route calculated by said route calculating means from the data regarding the respective links, said data being stored in said map data storing means and stores the read data in a guidance route memory, and said map displaying means displays a route mark using the data stored in the guidance route memory, and wherein a first map based on map data corresponding to a first scale is a detailed map, a second map based on map data corresponding to a second scale is a wide-area map and the map displaying means sets a respective set of said route marks on the guidance route such that the route marks displayed in the detailed map are larger in size than route marks displayed in the wide-area map, and wherein a first map based on map data corresponding to a first scale is a detailed map, a second map based on map data corresponding to a second scale is a wide-area map and the map displaying means displays route marks on alternate links of respective links forming a route in the wide-area map.

2. The mobile navigation system as claimed in claim 1, wherein said map displaying means displays a first map based on map data corresponding to a first scale, displays a second map based on map data corresponding to a second scale, displays a respective set of said plurality of route marks on the first or second map based on the route data, such that the route marks displayed on the first map are smaller in size than the route marks displayed on the second map.

3. The mobile navigation system as claimed in claim 1, wherein said map displaying means displays a first map based on map data corresponding to a first scale, displays a second map based on map data corresponding to a second scale, displays a respective set of said route marks on the first or second map based on the route data, such that the route marks displayed on the first map are different in shape from the route marks displayed on the second map.

4. The mobile navigation system as claimed in claim 1, wherein said map data storing means stores map data comprised of links and nodes therein and said map displaying means displays a route mark at a predetermined point on each link extending along a route represented by said route data.

5. The mobile navigation system as claimed in claim 4, wherein said map displaying means displays a route mark on each link having a predetermined range of length on a map.

6. The mobile navigation system as claimed in claim 1, wherein said map displaying means displays a first map based on map data corresponding to a first scale, displays a second map based on map data corresponding to a second scale, displays a respective set of said route marks on the first or second map based on the route data, and provides links with no route marks displayed thereon, of respective links on a route in the second map.

7. The mobile navigation system as claimed in claim 1, wherein a first map based on map data corresponding to a first scale is a detailed map, a second map based on map data corresponding to a second scale is a wide-area map, and the map displaying means affixes a route mark on each link having a length of at least a predetermined value, said links being selected from respective links on the guidance route in the wide-area map.

8. The mobile navigation system as claimed in claim 7, wherein said map data storing means stores map data comprised of link data each including a route mark decision bit and node data therein and said map displaying means applies route marks to links respectively, each link data including an active route mark decision bit, said links being selected from respective links on the guidance route in a wide-area map.

9. The mobile navigation system as claimed in claim 1, wherein a first map based on map data corresponding to a first scale is a detailed map, a second map based on map data corresponding to a second scale is a wide-area map, and the map displaying means affixes route marks to each link having a length of at least a predetermined value, said links being selected from respective links on guidance routes in the detailed map and the wide-area map.

10. The mobile navigation system as claimed in claim 9, wherein said map data storing means stores map data comprised of link data each including a route mark decision bit and node data therein and said map displaying means affixes route marks to links respectively, each link data including an active route mark decision bit, said links being selected from respective links on guidance routes in a detailed map and a wide-area map.

11. The mobile navigation system as claimed in claim 1, wherein a first map based on map data corresponding to a first scale is a detailed map, a second map based on map data corresponding to a second scale is a wide-area map, the map displaying means affixes a route mark indicative of a vehicle running direction to each link on the guidance route in the detailed map and a route mark not indicative of direction to each of the links on the guidance route in the wide-area map.

12. The mobile navigation system as claimed in claim 1, wherein said map displaying means applies a route mark having a shape corresponding to a scale of a displayed map to each link on guidance routes in maps drawn on respective scales.

13. The mobile navigation system as claimed in claim 1, wherein a first map based on map data corresponding to a first scale is a detailed map, a second map based on map data corresponding to a second scale is a wide-area map, the map displaying means affixes a route mark to each link on the guidance route in the detailed map and displays links on the guidance route in the wide-area map by lines respectively.

* * * * *